(12) United States Patent
Karantonis et al.

(10) Patent No.: US 12,515,051 B2
(45) Date of Patent: Jan. 6, 2026

(54) PROGRAMMING OF NEURAL STIMULATION THERAPY

(71) Applicant: Saluda Medical Pty Ltd, Level 1 (AU)

(72) Inventors: Dean Michael Karantonis, Artarmon (AU); Daniel John Parker, Artarmon (AU); Ian Cameron Gould, Artarmon (AU)

(73) Assignee: Saluda Medical Pty Ltd, Macquarie Park (AU)

( * ) Notice: Subject to any disclaimer, the term of this patent is extended or adjusted under 35 U.S.C. 154(b) by 284 days.

(21) Appl. No.: 18/188,339

(22) Filed: Mar. 22, 2023

(65) Prior Publication Data

US 2023/0321443 A1 Oct. 12, 2023

(30) Foreign Application Priority Data

Mar. 22, 2022 (AU) .................... 2022900717

(51) Int. Cl.
*A61N 1/36* (2006.01)
*A61B 5/294* (2021.01)
(Continued)

(52) U.S. Cl.
CPC .......... *A61N 1/36139* (2013.01); *A61B 5/294* (2021.01); *A61N 1/36157* (2013.01); *G06F 17/18* (2013.01); *A61N 1/37235* (2013.01)

(58) Field of Classification Search
CPC ............ A61N 1/36139; A61N 1/36157; A61N 1/37235; A61B 5/294; A61B 5/388; G06F 17/18
See application file for complete search history.

(56) References Cited

U.S. PATENT DOCUMENTS

| 6,931,281 B2 | 8/2005 | Bradley et al. |
| 2023/0241376 A1 | 8/2023 | Single et al. |

(Continued)

FOREIGN PATENT DOCUMENTS

| WO | WO2012155183 | 11/2012 |
| WO | WO2012155185 A1 | 11/2012 |

(Continued)

*Primary Examiner* — Paula J Stice
(74) *Attorney, Agent, or Firm* — Barnes & Thornburg LLP

(57) ABSTRACT

Disclosed is a method of computing a probability distribution of the suitability of measurement electrode configurations for a neuromodulation device. The method comprises: computing the probability distribution of suitability of measurement electrode configurations from: a predetermined stimulus program vector of the neuromodulation device; and prior patient data. Also disclosed is an automated method of setting a measurement electrode configuration for a neuromodulation device configured to deliver a neural stimulus to a neural pathway of a patient. The method comprises: obtaining an initial measurement electrode configuration for a predetermined stimulus program vector from a prior probability distribution of suitability of measurement electrode configurations; delivering a plurality of neural stimuli of different stimulus intensities to the neural pathway according to the stimulus program vector; measuring intensities of neural responses evoked by the neural stimuli using a current measurement electrode configuration; computing one or more quality measures of the evoked neural responses using the measured neural response intensities and the respective stimulus intensities; refining the probability distribution of suitability of measurement electrode configurations using the one or more quality measures; and obtaining a new measurement electrode configuration for the predetermined stimulus program vector using the refined prob- (Continued)

ability distribution of suitability of measurement electrode configurations.

9 Claims, 12 Drawing Sheets

(51) Int. Cl.
*A61N 1/372* (2006.01)
*G06F 17/18* (2006.01)

(56) References Cited

U.S. PATENT DOCUMENTS

| 2023/0277852 A1 | 9/2023 | Karantonis |
| 2023/0310864 A1 | 10/2023 | Parker |

FOREIGN PATENT DOCUMENTS

| WO | WO2012155188 | 11/2012 |
| WO | WO2015074121 | 5/2015 |
| WO | WO2015074121 A1 | 5/2015 |
| WO | WO2020101853 A1 | 5/2020 |
| WO | WO2021007615 A1 | 1/2021 |
| WO | WO2021158310 A1 | 8/2021 |
| WO | WO2022182611 A1 | 9/2022 |
| WO | WO2022183172 A1 | 9/2022 |
| WO | WO2022245970 A1 | 11/2022 |
| WO | WO2023064081 A1 | 4/2023 |
| WO | WO2023115132 | 6/2023 |
| WO | WO2023150020 A1 | 8/2023 |

PROGRAMMING OF NEURAL STIMULATION THERAPY

The present application claims priority from Australian Provisional Patent Application No. 2022900717 filed on Mar. 22, 2022, the contents of which are incorporated herein by reference in their entirety.

TECHNICAL FIELD

The present invention relates to neural stimulation therapy and in particular to measuring neural responses evoked by neural stimulation.

BACKGROUND OF THE INVENTION

There are a range of situations in which it is desirable to apply neural stimuli in order to alter neural function, a process known as neuromodulation. For example, neuromodulation is used to treat a variety of disorders including chronic neuropathic pain, Parkinson's disease, and migraine. A neuromodulation system applies an electrical pulse (stimulus) to neural tissue (fibres, or neurons) in order to generate a therapeutic effect. In general, the electrical stimulus generated by a neuromodulation system evokes a neural response known as an action potential in a neural fibre which then has either an inhibitory or excitatory effect. Inhibitory effects can be used to modulate an undesired process such as the transmission of pain, or excitatory effects may be used to cause a desired effect such as the contraction of a muscle.

When used to relieve neuropathic pain originating in the trunk and limbs, the electrical pulse is applied to the dorsal column (DC) of the spinal cord, a procedure referred to as spinal cord stimulation (SCS). Such a system typically comprises an implanted electrical pulse generator, and a power source such as a battery that may be transcutaneously rechargeable by wireless means, such as inductive transfer. An electrode array is connected to the pulse generator, and is implanted adjacent the target neural fibre(s) in the spinal cord, typically in the dorsal epidural space above the dorsal column. An electrical pulse of sufficient intensity applied to the target neural fibres by a stimulus electrode causes the depolarisation of neurons in the fibres, which in turn generates an action potential in the fibres. Action potentials propagate along the fibres in orthodromic (in afferent fibres this means towards the head, or rostral) and antidromic (in afferent fibres this means towards the cauda, or caudal) directions. The fibres being stimulated in this way inhibit the transmission of pain from a region of the body innervated by the target neural fibres (the dermatome) to the brain. To sustain the pain relief effects, stimuli are applied repeatedly, for example at a frequency in the range of 30 Hz-100 Hz.

For effective and comfortable neuromodulation, it is necessary to maintain stimulus intensity above a recruitment threshold. Stimuli below the recruitment threshold will fail to recruit sufficient neurons to generate action potentials with a therapeutic effect. In almost all neuromodulation applications, response from a single class of fibre is desired, but the stimulus waveforms employed can evoke action potentials in other classes of fibres which cause unwanted side effects. In pain relief, it is therefore desirable to apply stimuli with intensity below a discomfort threshold, above which uncomfortable or painful percepts arise due to over-recruitment of $A\beta$ fibres. When recruitment is too large, $A\beta$ fibres produce uncomfortable sensations. Stimulation at high intensity may even recruit $A\delta$ fibres, which are sensory nerve fibres associated with acute pain, cold and pressure sensation. It is therefore desirable to maintain stimulus intensity within a therapeutic range between the recruitment threshold and the discomfort threshold.

The task of maintaining appropriate neural recruitment is made more difficult by electrode migration (change in position over time) and/or postural changes of the implant recipient (patient), either of which can significantly alter the neural recruitment arising from a given stimulus, and therefore the therapeutic range. There is room in the epidural space for the electrode array to move, and such array movement from migration or posture change alters the electrode-to-fibre distance and thus the recruitment efficacy of a given stimulus. Moreover, the spinal cord itself can move within the cerebrospinal fluid (CSF) with respect to the dura. During postural changes, the amount of CSF and/or the distance between the spinal cord and the electrode can change significantly. This effect is so large that postural changes alone can cause a previously comfortable and effective stimulus regime to become either ineffectual or painful.

Another control problem facing neuromodulation systems of all types is achieving neural recruitment at a sufficient level for therapeutic effect, but at minimal expenditure of energy. The power consumption of the stimulation paradigm has a direct effect on battery requirements which in turn affects the device's physical size and lifetime. For rechargeable systems, increased power consumption results in more frequent charging and, given that batteries only permit a limited number of charging cycles, ultimately this reduces the implanted lifetime of the device.

Attempts have been made to address such problems by way of feedback or closed-loop control, such as using the methods set forth in International Patent Publication No. WO2012/155188 by the present applicant. Feedback control seeks to compensate for relative nerve/electrode movement by controlling the intensity of the delivered stimuli so as to maintain a substantially constant neural recruitment. The intensity of a neural response evoked by a stimulus may be used as a feedback variable representative of the amount of neural recruitment. A signal representative of the neural response may be sensed by a measurement electrode in electrical communication with the recruited neural fibres, and processed to obtain the feedback variable. Based on the response intensity, the intensity of the applied stimulus may be adjusted to maintain the response intensity within a therapeutic range.

It is therefore desirable to accurately measure the intensity and other characteristics of a neural response evoked by the stimulus. The action potentials generated by the depolarisation of a large number of fibres by a stimulus sum to form a measurable signal known as an evoked compound action potential (ECAP). Accordingly, an ECAP is the sum of responses from a large number of single fibre action potentials. The ECAP generated from the depolarisation of a group of similar fibres may be measured at a measurement electrode as a positive peak potential, then a negative peak, followed by a second positive peak. This morphology is caused by the region of activation passing the measurement electrode as the action potentials propagate along the individual fibres.

Approaches proposed for obtaining a neural response measurement are described by the present applicant in International Patent Publication No. WO2012/155183, the content of which is incorporated herein by reference.

However, neural response measurement can be a difficult task as a neural response component in the sensed signal will typically have a maximum amplitude in the range of microvolts. In contrast, a stimulus applied to evoke the response is typically several volts, and manifests in the measured response as crosstalk of that magnitude. Moreover, stimulus generally results in electrode artefact, which manifests in the measured response as a decaying output of the order of several millivolts after the end of the stimulus. As the neural response can be contemporaneous with the stimulus crosstalk and/or the stimulus artefact, neural response measurements present a difficult challenge of measurement amplifier design. For example, to resolve a 10 µV ECAP with 1 µV resolution in the presence of stimulus crosstalk of 5 V requires an amplifier with a dynamic range of 134 dB, which is impractical in implantable devices. In practice, many non-ideal aspects of a circuit lead to artefact, and as these aspects mostly result a time-decaying artefact waveform of positive or negative polarity, their identification and elimination can be laborious.

Evoked neural responses are less difficult to detect when they appear later in time than the artefact, or when the signal-to-noise ratio is sufficiently high. The artefact is often restricted to a time of 1-2 ms after the stimulus and so, provided the neural response is detected after this time window, a neural response measurement can be more easily obtained. This is the case in surgical monitoring where there are large distances (e.g. more than 12 cm for nerves conducting at 60 ms$^{-1}$) between the stimulus and measurement electrodes so that the propagation time from the stimulus site to the measurement electrodes exceeds 2 ms, which is longer than the typical duration of stimulus artefact.

However, to characterize the responses from the dorsal column, high stimulation currents are required. Similarly, any implanted neuromodulation device will necessarily be of compact size, so that for such devices to monitor the effect of applied stimuli, the stimulus electrode(s) and measurement electrode(s) will necessarily be in close proximity. In such situations the measurement process must overcome artefact directly.

Closed-loop neural stimulation therapy is governed by a number of parameters to which values must be assigned to implement the therapy. The effectiveness of the therapy depends in large measure on the suitability of the assigned parameter values to the patient undergoing the therapy. As patients vary significantly in their physiological characteristics, a "one-size-fits-all" approach to parameter value assignment is likely to result in ineffective therapy for a large proportion of patients. An important preliminary task, once a neuromodulation device has been implanted in a patient, is therefore to assign values to the therapy parameters that maximise the effectiveness of the therapy the device will deliver to that particular patient. This task is known as programming or fitting the device. Programming generally involves applying certain test stimuli via the device, recording responses, and based on the recorded responses, inferring or calculating the most effective parameter values for the patient. The resulting parameter values are then formed into a "program" that may be loaded to the device to govern subsequent therapy. Some of the recorded responses may be neural responses evoked by the test stimuli, which provide an objective source of information that may be analysed along with subjective responses elicited from the patient. In an effective programming system, the more responses that are analysed, the more effective the eventual assigned parameter values should be.

However, programming may be costly and time-consuming if unnecessarily prolonged. There is therefore an incentive to minimise the number of test stimuli to be applied and the amount of information to be recorded and analysed in order to produce the assigned values of the therapy parameters. One task of particular importance in programming a closed-loop neural stimulation therapy is to set parameters for ECAP measurement. In principle any electrode not in use as a stimulus electrode may be used as a measurement electrode. Therefore, one task is to choose the most suitable measurement electrode, or pair of measurement electrodes, for a given stimulus electrode or set of stimulus electrodes. An ECAP changes morphologically as it propagates along the spinal cord and therefore the ideal parameters of any kind of morphologically-matched ECAP detector are different at different measurement electrodes because of their different locations relative to the stimulus site where the ECAP is first evoked. One such parametric ECAP detector is disclosed in International Patent Publication No. WO2015/074121 by the present applicant, the contents of which are incorporated herein by reference. Another task is therefore to select the most suitable combination of parameters for a parametric ECAP detector at the chosen measurement electrode pair.

To select a measurement electrode pair, and a combination of parameters for a parametric ECAP detector at the selected measurement electrode pair, one approach is a brute-force or exhaustive search. Responses to test stimuli may be measured using all possible measurement electrode pairs and all possible combinations of parameters of the parametric ECAP detector at each measurement electrode pair. The measurement electrode pair and parameter combination that provides the best quality ECAP measurement may be selected. It would clearly be undesirably time-consuming to carry out an exhaustive search over all possible combinations of parameters over all possible measurement electrode pairs to choose the most suitable detector parameters at the best measurement electrode pair.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood to mean that the element may be any one of the listed options, or may be any combination of two or more of the listed options.

SUMMARY OF THE INVENTION

Disclosed herein are systems and methods for programming closed-loop neural stimulation devices that select or recommend the most suitable combination of measurement electrode configuration and ECAP detector (measurement) parameters for a given stimulus program (comprising stimulus electrode configuration and stimulus parameters). The disclosed systems and methods estimate prior distributions of suitability of measurement electrode configuration and ECAP detector parameters at each measurement electrode configuration using prior patient data and the given stimulus program. The disclosed systems and methods then sample these distributions, apply stimuli and measure the responses using the sampled measurement electrode configuration and ECAP detector parameters, and use the quality of the measurements to refine the distributions. This process continues iteratively until the distributions have converged sufficiently to give a firm recommendation of the most suitable measurement electrode configuration and ECAP detector parameters for the given stimulus program. These recommendations may be adopted automatically or provided to a user of the programming system for manual review. Alternatively, the recommended distributions may be compared with a manually chosen measurement electrode configuration and ECAP detector parameters and an indication of suitability provided to a user of the programming system.

The iterative process of distribution refinement may be carried out at intervals once the device has been initially programmed to monitor for changes in circumstances that may over time warrant a change in the measurement electrode configuration and measurement parameters. This reduces the need for costly and time-consuming manual re-programming ECAP sessions.

According to a first aspect of the present technology, there is provided a method of computing a probability distribution of suitability of measurement electrode configurations for a neuromodulation device. The method comprises: computing the probability distribution of suitability of measurement electrode configurations from: a predetermined stimulus program vector of the neuromodulation device; and prior patient data.

According to a second aspect of the present technology, there is provided a neuromodulation system comprising: a neuromodulation device for controllably delivering a neural stimulus, and a processor. The neuromodulation device comprises: a plurality of implantable electrodes including one or more stimulus electrodes and one or more sense electrodes; a stimulus source configured to provide a neural stimulus to be delivered to a neural pathway of a patient in order to evoke a neural response on the neural pathway; measurement circuitry configured to process a signal sensed at a measurement configuration comprising one or more of the one or more sense electrodes subsequent to the delivered neural stimulus, the sensed signal including an evoked neural response; and a control unit configured to: control the stimulus source to provide the neural stimulus according to a predetermined stimulus program vector; and measure an intensity of the evoked neural response in the sensed signal using a measurement parameter vector. The processor is configured to: compute a probability distribution of suitability of measurement electrode configurations for the neuromodulation device from: the predetermined stimulus program vector of the neuromodulation device; and prior patient data.

In some embodiments of the first and second aspects of the invention, the probability distribution of suitability of measurement electrode configurations for the neuromodulation device may be computed by extracting from the prior patient data a set of measurement electrode configurations corresponding to the predetermined stimulus program vector; and constructing the probability distribution of suitability of measurement electrode configurations from the extracted set of measurement electrode configurations. The constructing may in some embodiments comprise constructing the probability distribution of suitability of measurement electrode configurations from a histogram of the extracted set of measurement electrode configurations.

In some embodiments of the first and second aspects of the invention, an initial measurement electrode configuration for the predetermined stimulus program vector may be obtained from the probability distribution of suitability of measurement electrode configurations. The one or more probability distributions of suitability of measurement parameters for one or more respective measurement electrode configurations may in some embodiments be computed using the predetermined stimulus program vector and the prior patient data. An initial measurement electrode configuration for the predetermined stimulus program vector may in some embodiments be obtained from the probability distribution of suitability of measurement electrode configurations. An initial measurement parameter vector for the predetermined stimulus program vector and the sample measurement electrode configuration may in some embodiments be obtained by sampling a probability distribution of suitability of measurement parameters of the one or more probability distributions of suitability of measurement parameters corresponding to the sample measurement electrode configuration.

An intensity of the evoked neural response in a signal sensed at the sample measurement electrode configuration may in some embodiments be measured using the sample measurement parameter vector. A stimulus intensity of a subsequent neural stimulus may in some embodiments be adjusted based on the measured intensity of the evoked neural response. The measurement parameters may in some embodiments be parameters for a parametric ECAP detector at the respective measurement electrode configurations.

According to a third aspect of the present technology, there is provided an automated method of setting a measurement electrode configuration for a neuromodulation device configured to deliver a neural stimulus to a neural pathway of a patient. The method comprises: obtaining an initial measurement electrode configuration for a predetermined stimulus program vector from a prior probability distribution of suitability of measurement electrode configurations; delivering a plurality of neural stimuli of different stimulus intensities to the neural pathway according to the stimulus program vector; measuring intensities of neural responses evoked by the neural stimuli using a current measurement electrode configuration; computing one or more quality measures of the evoked neural responses using the measured neural response intensities and the respective stimulus intensities; refining the probability distribution of suitability of measurement electrode configurations using the one or more quality measures; and obtaining a new measurement electrode configuration for the predetermined stimulus program vector using the refined probability distribution of suitability of measurement electrode configurations.

According to a fourth aspect of the present technology, there is provided a neuromodulation system comprising a neuromodulation device for controllably delivering a neural stimulus, and a processor. The neuromodulation device comprises: a plurality of implantable electrodes including one or more stimulus electrodes and one or more sense electrodes; a stimulus source configured to provide a neural stimulus to be delivered to a neural pathway of a patient in order to evoke a neural response on the neural pathway; measurement circuitry configured to process a signal sensed at a measurement configuration comprising one or more of the one or more sense electrodes subsequent to the delivered neural stimulus, the sensed signal including an evoked neural response; and a control unit configured to: control the stimulus source to provide the neural stimulus according to a predetermined stimulus program vector; and measure an intensity of the evoked neural response in the sensed signal using a measurement parameter vector. The processor is configured to: obtain an initial measurement electrode configuration for the predetermined stimulus program vector from a prior probability distribution of suitability of measurement electrode configurations; instruct the control unit to deliver a plurality of neural stimuli of different stimulus intensities to the neural pathway according to the predetermined stimulus program vector; measure intensities of neural responses evoked by the neural stimuli and sensed via a current measurement electrode configuration; compute one or more quality measures of the evoked neural responses using the measured neural response intensities and the respective stimulus intensities; refine the prior probability distribution of suitability of measurement electrode configurations using the one or more quality measures; and obtain a new measurement electrode configuration for the predetermined stimulus program vector from the refined prior probability distribution of suitability of measurement electrode configurations.

In some embodiments of the third and fourth aspects of the invention, the instructing, measuring, computing, refining, and obtaining may be repeated until a stopping criterion is reached. The prior probability distribution of suitability of measurement electrode configurations may in some embodiments be computed from the predetermined stimulus program vector of the neuromodulation device; and prior patient data.

Some embodiments of the third and fourth aspects of the invention may further comprise obtaining an initial measurement parameter vector for the predetermined stimulus program vector and the initial measurement electrode configuration from one of a plurality of prior probability distributions of suitability of measurement parameters corresponding to the initial measurement electrode configuration and the stimulus program vector; measuring the intensities of the neural responses evoked by the neural stimuli and sensed via the initial measurement electrode configuration using the initial measurement parameter vector; and refining the prior probability distribution of suitability of measurement parameters corresponding to the initial measurement electrode configuration using the one or more quality measures. Some embodiments may further obtain a new measurement parameter vector for the neuromodulation device using the refined probability distribution of suitability of measurement parameters corresponding to the new measurement electrode configuration. Some embodiments may further compute the plurality of probability distributions of suitability of measurement parameters for respective measurement electrode configurations using: the predetermined stimulus program vector of the neuromodulation device; and prior patient data.

Some embodiments of the invention further comprise an external computing device in communication with the neuromodulation device. The processor may form part of the external computing device, and/or may form part of the neuromodulation device.

References herein to estimation, determination, comparison and the like are to be understood as referring to an automated process carried out on data by a processor operating to execute a predefined procedure suitable to effect the described estimation, determination and/or comparison step(s). The technology disclosed herein may be implemented in hardware (e.g., using digital signal processors, application specific integrated circuits (ASICs) or field programmable gate arrays (FPGAs)), or in software (e.g., using instructions tangibly stored on non-transitory computer-readable media for causing a data processing system to perform the steps described herein), or in a combination of hardware and software. The disclosed technology can also be embodied as computer-readable code on a computer-readable medium. The computer-readable medium can include any data storage device that can store data which can thereafter be read by a computer system. Examples of the computer-readable medium include read-only memory ("ROM"), random-access memory ("RAM"), magnetic tape, optical data storage devices, flash storage devices, or any other suitable storage devices. The computer-readable medium can also be distributed over network-coupled computer systems so that the computer-readable code is stored and/or executed in a distributed fashion.

BRIEF DESCRIPTION OF THE DRAWINGS

One or more implementations of the invention will now be described with reference to the accompanying drawings, in which.

DETAILED DESCRIPTION OF THE PRESENT TECHNOLOGY

Figure 1:
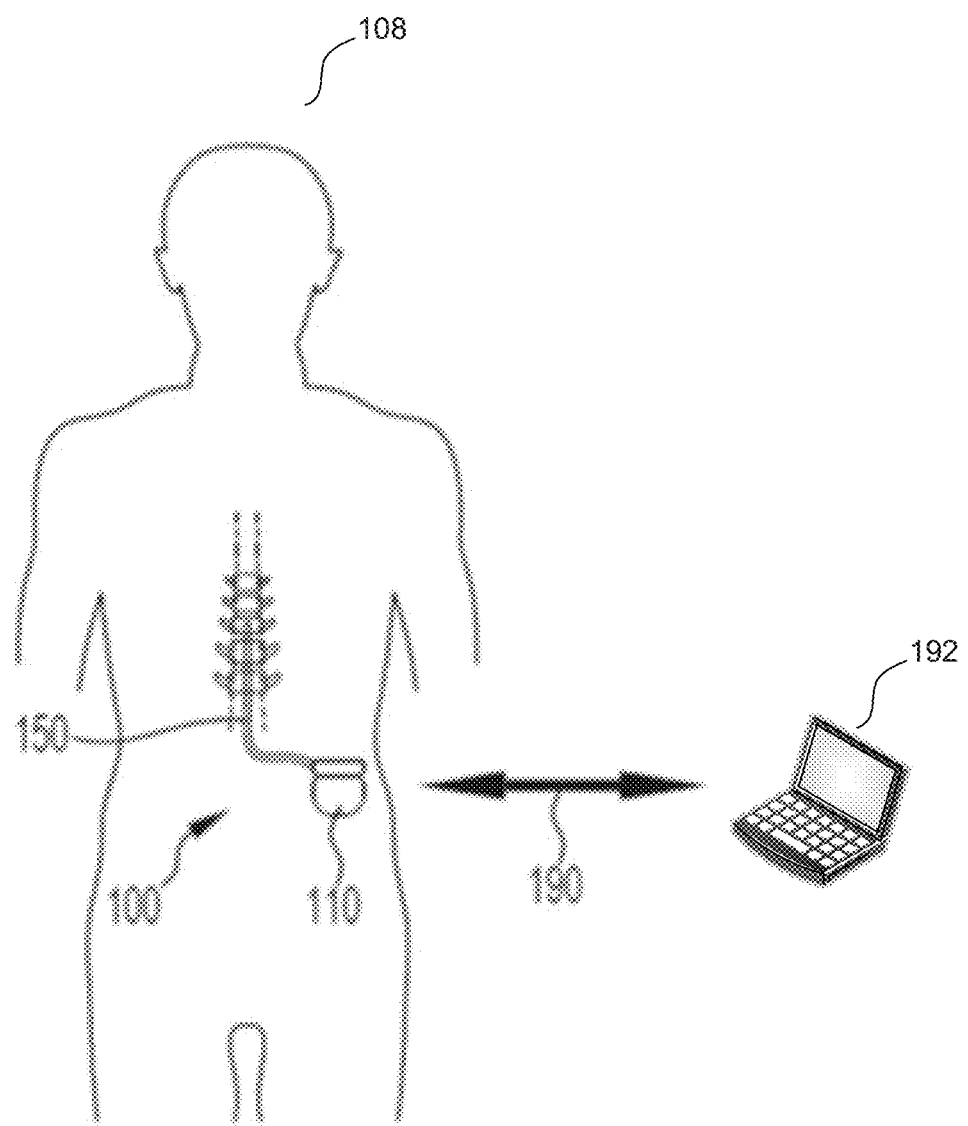
FIG. 1 schematically illustrates an implanted spinal cord stimulator, according to one implementation of the present technology.

FIG. 1 schematically illustrates an implanted spinal cord stimulator 100 in a patient 108, according to one implementation of the present technology. Stimulator 100 comprises an electronics module 110 implanted at a suitable location. In one implementation, stimulator 100 is implanted in the patient's lower abdominal area or posterior superior gluteal region. In other implementations, the electronics module 110 is implanted in other locations, such as in a flank or sub-clavicularly. Stimulator 100 further comprises an electrode array 150 implanted within the epidural space and connected to the module 110 by a suitable lead. The electrode array 150 may comprise one or more electrodes such as electrode pads on a paddle lead, circular (e.g., ring) electrodes surrounding the body of the lead, conformable electrodes, cuff electrodes, segmented electrodes, or any other type of electrodes capable of forming unipolar, bipolar or multipolar electrode configurations for stimulation and measurement. The electrodes may pierce or affix directly to the tissue itself.

Numerous aspects of the operation of implanted stimulator 100 may be programmable by an external computing device 192, which may be operable by a user such as a clinician or the patient 108. Moreover, implanted stimulator 100 serves a data gathering role, with gathered data being communicated to external device 192 via a transcutaneous communications channel 190. Communications channel 190 may be active on a substantially continuous basis, at periodic intervals, at non-periodic intervals, or upon request from the external device 192. External device 192 may thus provide a clinical interface configured to program the implanted stimulator 100 and recover data stored on the implanted stimulator 100. This configuration is achieved by program instructions collectively referred to as the Clinical Programming Application (CPA) and stored in an instruction memory of the clinical interface.

Figure 2:
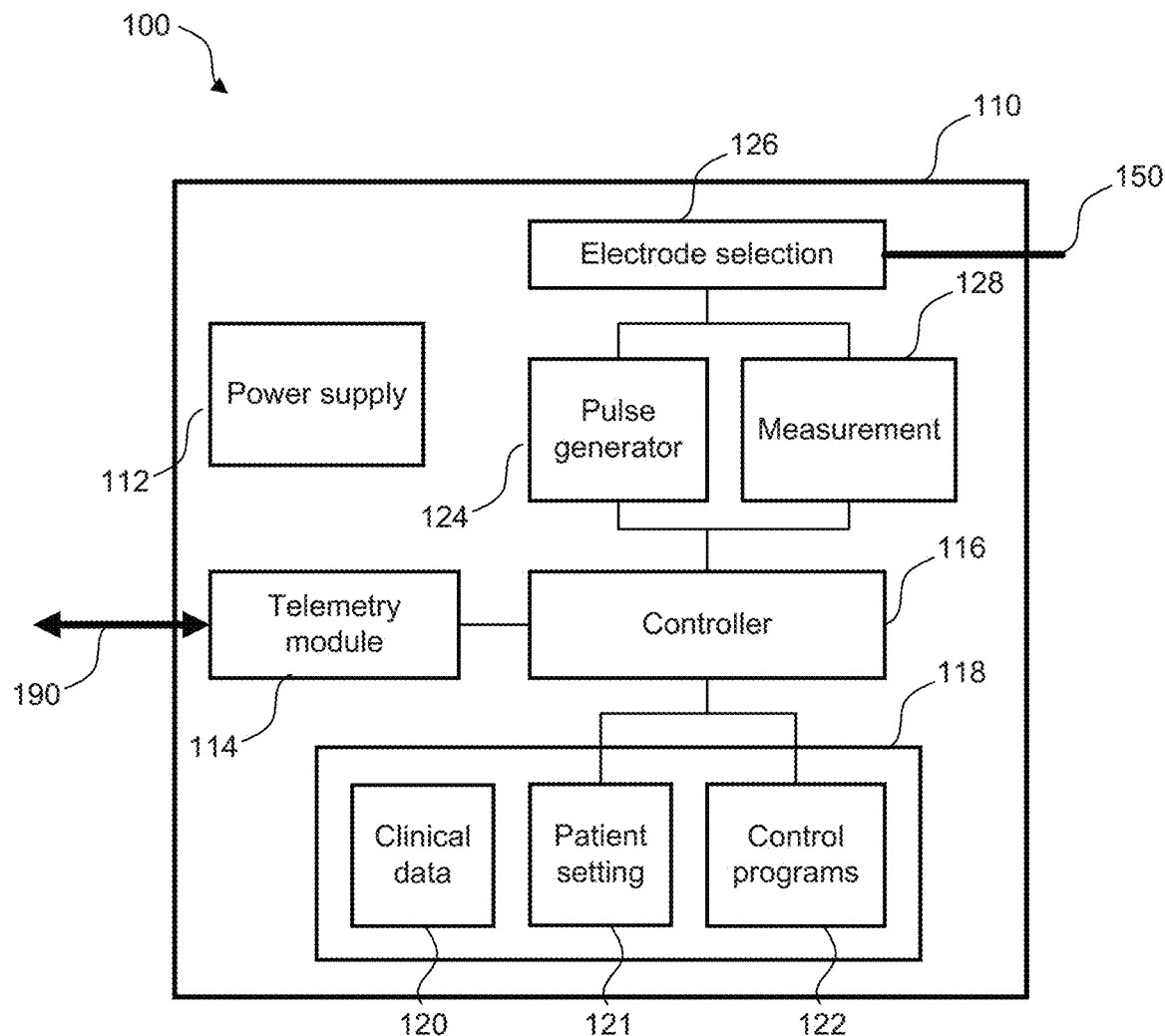
FIG. 2 is a block diagram of the stimulator of FIG. 1.

FIG. 2 is a block diagram of the stimulator 100. Electronics module 110 contains a battery 112 and a telemetry module 114. In implementations of the present technology, any suitable type of transcutaneous communications channel 190, such as infrared (IR), radiofrequency (RF), capacitive and/or inductive transfer, may be used by telemetry module 114 to transfer power and/or data to and from the electronics module 110 via communications channel 190. Module controller 116 has an associated memory 118 storing one or more of clinical data 120, clinical settings 121, control programs 122, and the like. Controller 116 controls a pulse generator 124 to generate stimuli, such as in the form of electrical pulses, in accordance with the clinical settings 121 and control programs 122. Electrode selection module 126 switches the generated pulses to the selected electrode(s) of electrode array 150, for delivery of the pulses to the tissue surrounding the selected electrode(s). Measurement circuitry 128, which may comprise an amplifier and/or an analog-to-digital converter (ADC), is configured to process signals comprising neural responses sensed at measurement electrode(s) of the electrode array 150 as selected by electrode selection module 126.

Figure 3:
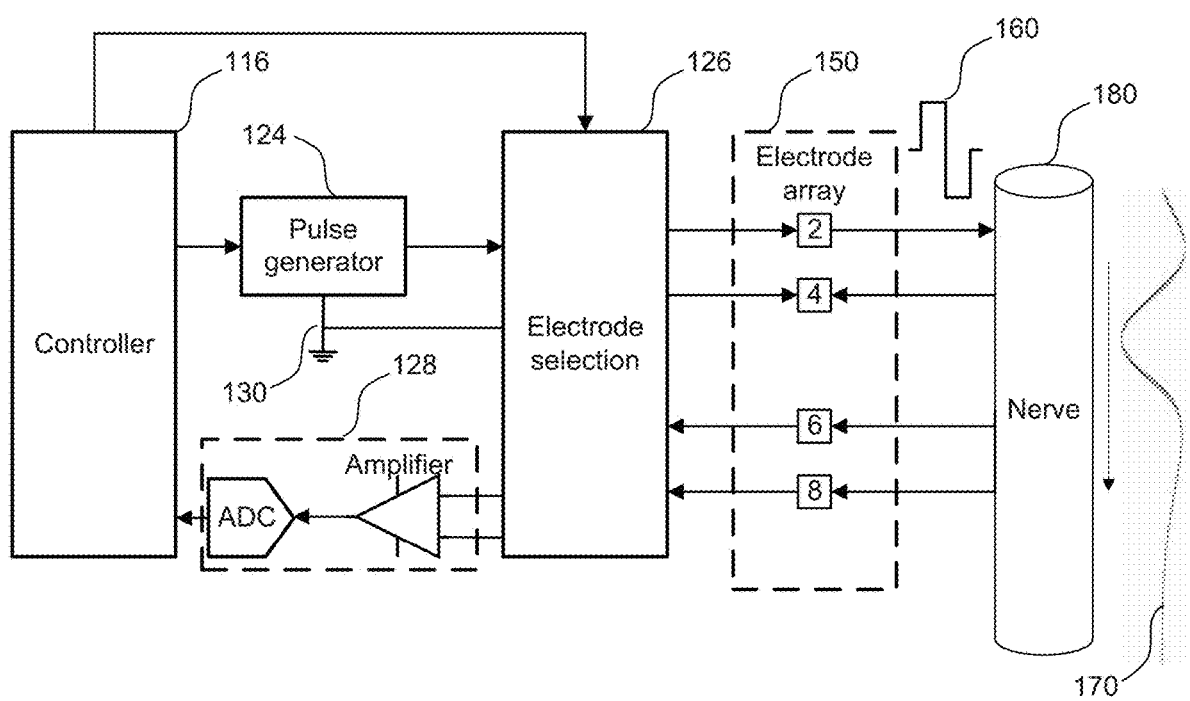
FIG. 3 is a schematic illustrating interaction of the implanted stimulator of FIG. 1 with a nerve.

FIG. 3 is a schematic illustrating interaction of the implanted stimulator 100 with a nerve 180 in the patient 108. In the implementation illustrated in FIG. 3 the nerve 180 may be located in the spinal cord, however in alternative implementations the stimulator 100 may be positioned adjacent any desired neural tissue including a peripheral nerve, visceral nerve, parasympathetic nerve or a brain structure. Electrode selection module 126 selects a stimulus electrode 2 of electrode array 150 through which to deliver a pulse from the pulse generator 124 to surrounding tissue including nerve 180. A pulse may comprise one or more phases, e.g. a biphasic stimulus pulse 160 comprises two phases. Electrode selection module 126 also selects a return electrode 4 of the electrode array 150 for stimulus current return in each phase, to maintain a zero net charge transfer. An electrode may act as both a stimulus electrode and a return electrode over a complete multiphasic stimulus pulse. The use of two electrodes in this manner for delivering and returning current in each stimulus phase is referred to as bipolar stimulation. Alternative embodiments may apply other forms of bipolar stimulation, or may use a greater number of stimulus and/or return electrodes. The set of stimulus and return electrodes is referred to as the stimulus electrode configuration. Electrode selection module 126 is illustrated as connecting to a ground 130 of the pulse generator 124 to enable stimulus current return via the return electrode 4. However, other connections for charge recovery may be used in other implementations.

Delivery of an appropriate stimulus via stimulus electrodes 2 and 4 to the nerve 180 evokes a neural response 170 comprising an evoked compound action potential (ECAP) which will propagate along the nerve 180 as illustrated at a rate known as the conduction velocity. The ECAP may be evoked for therapeutic purposes, which in the case of a spinal cord stimulator for chronic pain may be to create paraesthesia at a desired location. To this end, the stimulus electrodes 2 and 4 are used to deliver stimuli periodically at any therapeutically suitable frequency, for example 30 Hz, although other frequencies may be used including frequencies as high as the kHz range. In alternative implementations, stimuli may be delivered in a non-periodic manner such as in bursts, or sporadically, as appropriate for the patient 108. To program the stimulator 100 to the patient 108, a clinician may cause the stimulator 100 to deliver stimuli of various configurations which seek to produce a sensation that is experienced by the user as paraesthesia. When a stimulus electrode configuration is found which evokes paraesthesia in a location and of a size which is congruent with the area of the patient's body affected by pain and of a quality that is comfortable for the patient, the clinician or the patient nominates that configuration for ongoing use. The therapy parameters may be loaded into the memory 118 of the stimulator 100 as the clinical settings 121.

Figure 6:
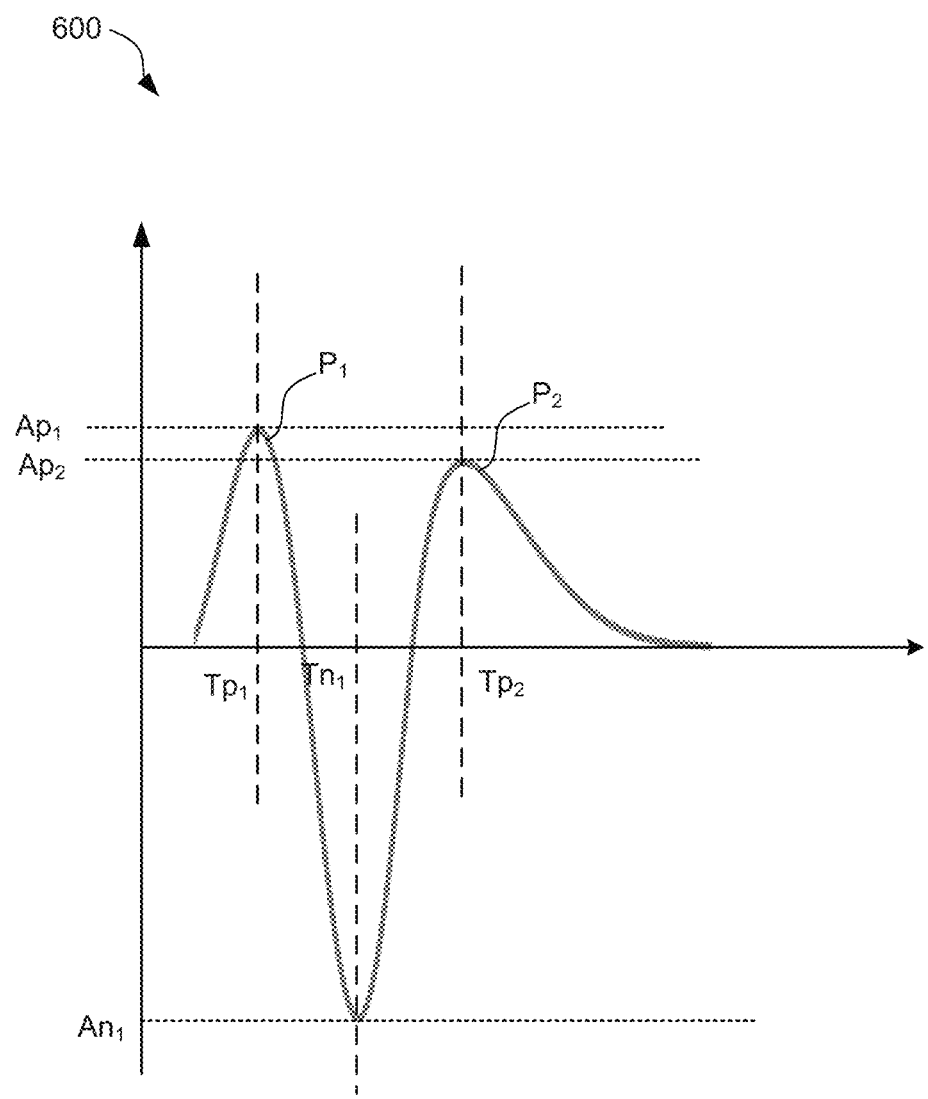
FIG. 6 illustrates the typical form of an electrically evoked compound action potential (ECAP) of a healthy subject.

FIG. 6 illustrates the typical form of an ECAP 600 of a healthy subject, as recorded at a single measurement electrode referenced to the system ground 130. The shape and duration of the single-ended ECAP 600 shown in FIG. 6 is predictable because it is a result of the ion currents produced by the ensemble of fibres depolarising and generating action potentials (APs) in response to stimulation. The evoked action potentials (EAPs) generated synchronously among a large number of fibres sum to form the ECAP 600. The ECAP 600 generated from the synchronous depolarisation of a group of similar fibres comprises a positive peak P1, then a negative peak N1, followed by a second positive peak P2. This shape is caused by the region of activation passing the measurement electrode as the action potentials propagate along the individual fibres.

The ECAP may be recorded differentially using two measurement electrodes, as illustrated in FIG. 3. Differential ECAP measurements are less subject to common-mode noise on the surrounding tissue than single-ended ECAP measurements. Depending on the polarity of recording, a differential ECAP may take an inverse form to that shown in FIG. 6, i.e. a form having two negative peaks N1 and N2, and one positive peak P1. Alternatively, depending on the distance between the two measurement electrodes, a differential ECAP may resemble the time derivative of the ECAP 600, or more generally the difference between the ECAP 600 and a time-delayed copy thereof.

The ECAP 600 may be characterised by any suitable characteristic(s) of which some are indicated in FIG. 6. The amplitude of the positive peak P1 is $Ap_1$ and occurs at time $Tp_1$. The amplitude of the positive peak P2 is Ape and occurs at time $Tp_2$. The amplitude of the negative peak P1 is $An_1$ and occurs at time $Tn_1$. The peak-to-peak amplitude is Ap₁+An₁. A recorded ECAP will typically have a maximum peak-to-peak amplitude in the range of microvolts and a duration of 2 to 3 ms.

The stimulator 100 is further configured to detect the existence and measure the intensity of ECAPs 170 propagating along nerve 180, whether such ECAPs are evoked by the stimulus from electrodes 2 and 4, or otherwise evoked. To this end, any electrodes of the array 150 may be selected by the electrode selection module 126 to serve as recording electrode 6 and reference electrode 8, whereby the electrode selection module 126 selectively connects the chosen electrodes to the inputs of the measurement circuitry 128. Thus, signals sensed by the measurement electrodes 6 and 8 subsequent to the respective stimuli are passed to the measurement circuitry 128, which may comprise a differential amplifier and an analog-to-digital converter (ADC), as illustrated in FIG. 3. The recording electrode and the reference electrode are referred to as the measurement electrode configuration. The measurement circuitry 128 for example may operate in accordance with the teachings of the above-mentioned International Patent Publication No. WO2012/155183.

Signals sensed by the measurement electrodes 6, 8 and processed by measurement circuitry 128 are further processed by an ECAP detector implemented within controller 116, configured by control programs 122, to obtain information regarding the effect of the applied stimulus upon the nerve 180. In some implementations, the sensed signals are processed by the ECAP detector in a manner which measures and stores one or more characteristics from each evoked neural response or group of evoked neural responses contained in the sensed signal. In one such implementation, the characteristics comprise a peak-to-peak ECAP amplitude in microvolts (µV). For example, the sensed signals may be processed by the ECAP detector to determine the peak-to-peak ECAP amplitude in accordance with the teachings of International Patent Publication No. WO2015/074121, the contents of which are incorporated herein by reference. Alternative implementations of the ECAP detector may measure and store an alternative characteristic from the neural response, or may measure and store two or more characteristics from the neural response.

Stimulator 100 applies stimuli over a potentially long period such as days, weeks, or months and during this time may store characteristics of neural responses, clinical settings, paraesthesia target level, and other operational parameters in memory 118. To effect suitable SCS therapy, stimulator 100 may deliver tens, hundreds or even thousands of stimuli per second, for many hours each day. Each neural response or group of responses generates one or more characteristics such as a measure of the intensity of the neural response. Stimulator 100 thus may produce such data at a rate of tens or hundreds of Hz, or even kHz, and over the course of hours or days this process results in large amounts of clinical data 120 which may be stored in the memory 118. Memory 118 is however necessarily of limited capacity and care is thus required to select compact data forms for storage into the memory 118, to ensure that the memory 118 is not exhausted before such time that the data is expected to be retrieved wirelessly by external device 192, which may occur only once or twice a day, or less.

Figure 4A:
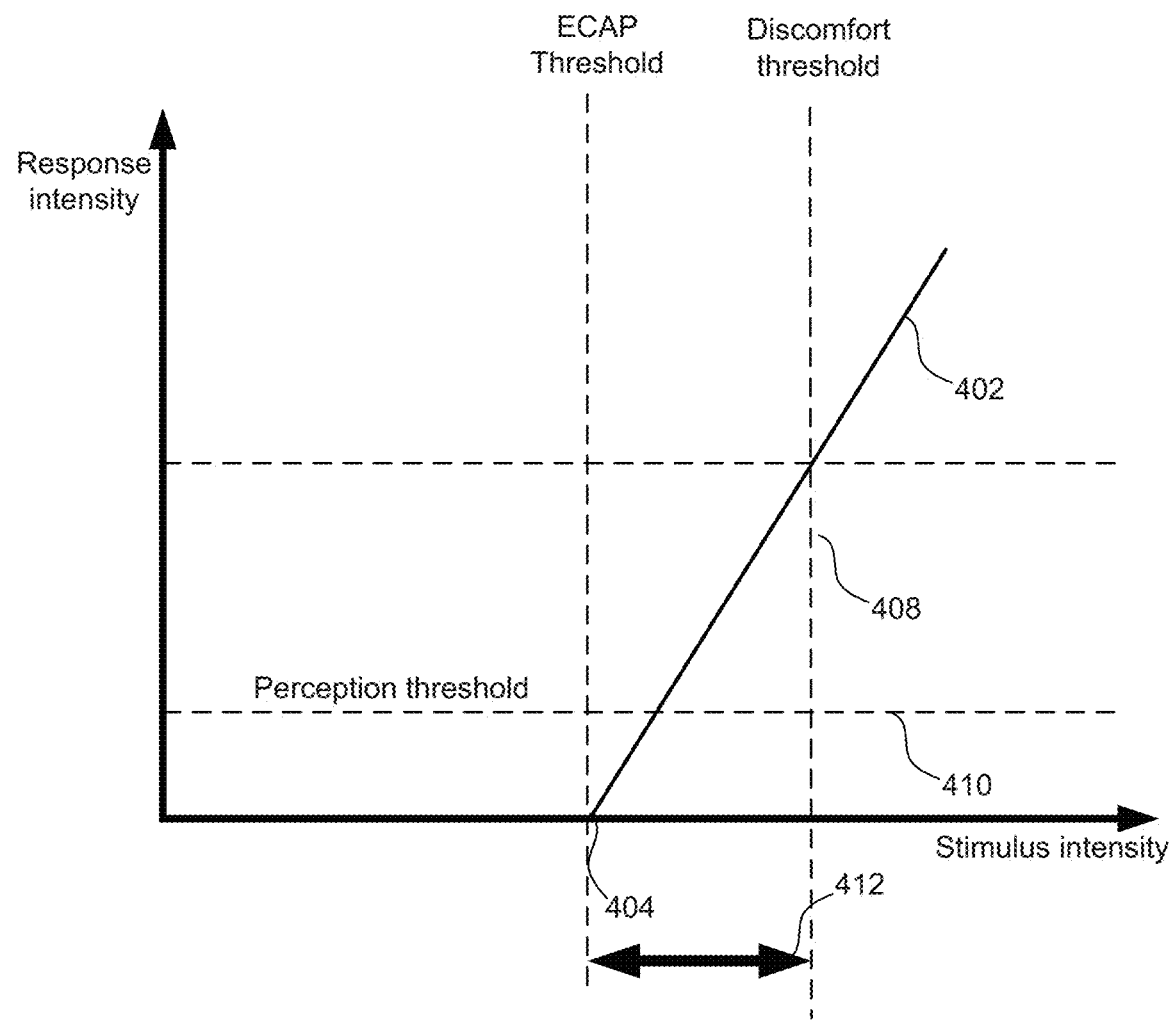
FIG. 4a illustrates an idealised activation plot for one posture of a patient undergoing neural stimulation.

An activation plot, or growth curve, is an approximation to the relationship between stimulus intensity (e.g. an amplitude of the current pulse 160) and intensity of neural response 170 resulting from the stimulus (e.g. an ECAP amplitude). FIG. 4a illustrates an idealised activation plot 402 for one posture of the patient 108. The activation plot 402 shows a linearly increasing ECAP amplitude for stimulus intensity values above a threshold 404 referred to as the ECAP threshold. The ECAP threshold exists because of the binary nature of fibre recruitment; if the field strength is too low, no fibres will be recruited. However, once the field strength exceeds a threshold, fibres begin to be recruited, and their individual evoked action potentials are independent of the strength of the field. The ECAP threshold 404 therefore reflects the field strength at which significant numbers of fibres begin to be recruited, and the increase in response intensity with stimulus intensity above the ECAP threshold reflects increasing numbers of fibres being recruited. Below the ECAP threshold 404, the ECAP amplitude may be taken to be zero. Above the ECAP threshold 404, the activation plot 402 has a positive, approximately constant slope indicating a linear relationship between stimulus intensity and the ECAP amplitude. Such a relationship may be modelled as:

$$y = \begin{cases} S(s-T), & s \geq T \\ 0, & s < T \end{cases} \quad (1)$$

where s is the stimulus intensity, y is the ECAP amplitude, T is the ECAP threshold and S is the slope of the activation plot (referred to herein as the patient sensitivity). The slope S and the ECAP threshold T are the key parameters of the activation plot 402.

FIG. 4a also illustrates a discomfort threshold 408, which is a stimulus intensity above which the patient 108 experiences uncomfortable or painful stimulation. FIG. 4a also illustrates a perception threshold 410. The perception threshold 410 corresponds to an ECAP amplitude that is perceivable by the patient. There are a number of factors which can influence the position of the perception threshold 410, including the posture of the patient. Perception threshold 410 may correspond to a stimulus intensity that is greater than the ECAP threshold 404, as illustrated in FIG. 4a, if patient 108 does not perceive low levels of neural activation. Conversely, the perception threshold 410 may correspond to a stimulus intensity that is less than the ECAP threshold 404, if the patient has a high perception sensitivity to lower levels of neural activation than can be detected in an ECAP, or if the signal to noise ratio of the ECAP is low.

For effective and comfortable operation of an implantable neuromodulation device such as the stimulator 100, it is desirable to maintain stimulus intensity within a therapeutic range. A stimulus intensity within a therapeutic range 412 is above the ECAP threshold 404 and below the discomfort threshold 408. In principle, it would be straightforward to measure these limits and ensure that stimulus intensity, which may be closely controlled, always falls within the therapeutic range 412. However, the activation plot, and therefore the therapeutic range 412, varies with the posture of the patient 108.

Figure 4B:
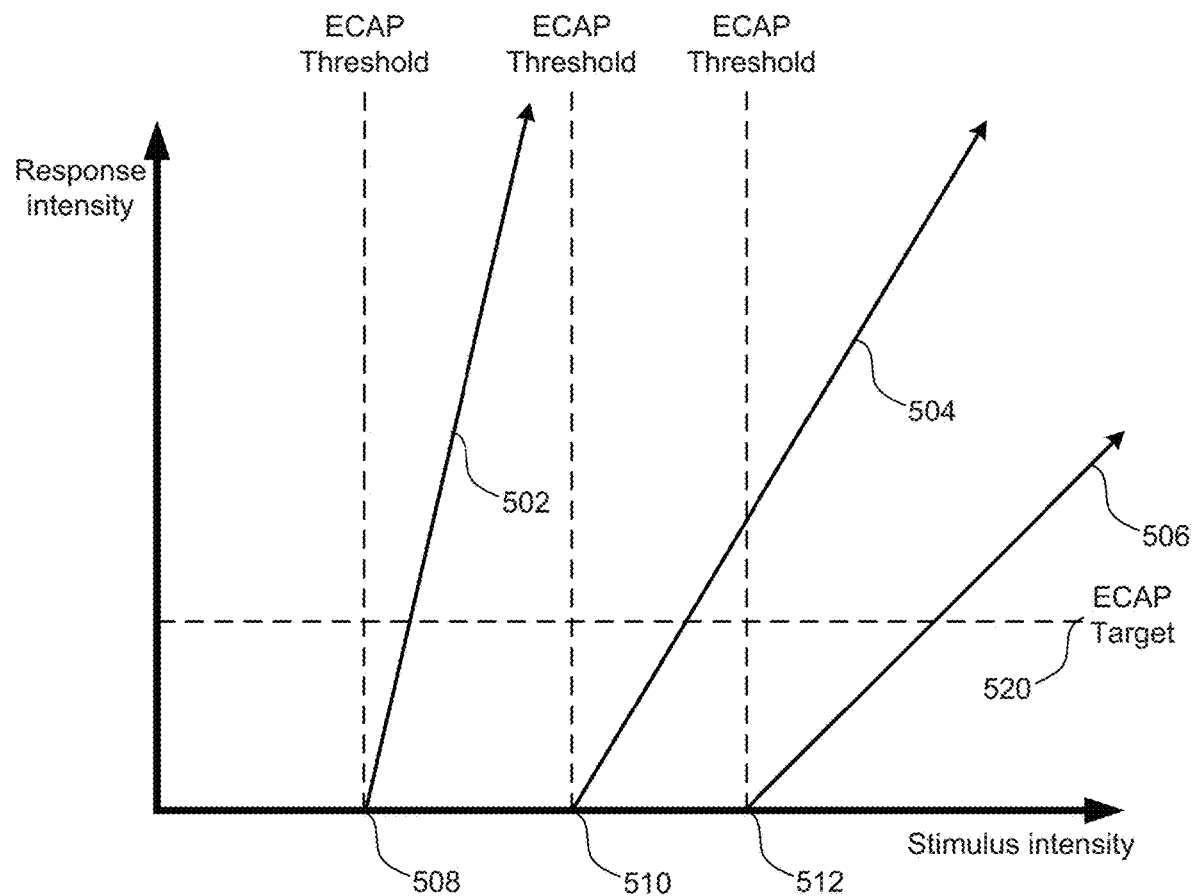
FIG. 4b illustrates the variation in the activation plots with changing posture of the patient.

FIG. 4b illustrates the variation in the activation plots with changing posture of the patient. A change in posture of the patient may cause a change in impedance of the electrode-tissue interface or a change in the distance between electrodes and the neurons. While the activation plots for only three postures, 502, 504 and 506, are shown in FIG. 4b, the activation plot for any given posture can lie between or outside the activation plots shown, on a continuously varying basis depending on posture. Consequently, as the patient's posture changes, the ECAP threshold changes, as indicated by the ECAP thresholds 508, 510, and 512 for the respective activation plots 502, 504, and 506. Additionally, as the patient's posture changes, the slope of the activation plot also changes, as indicated by the varying slopes of activation plots 502, 504, and 506. In general, as the distance between the stimulus electrodes and the spinal cord increases, the ECAP threshold increases and the slope of the activation plot decreases. The activation plots 502, 504, and 506 therefore correspond to increasing distance between stimulus electrodes and spinal cord, and decreasing patient sensitivity.

To keep the applied stimulus intensity within the therapeutic range as patient posture varies, in some implementations an implantable neuromodulation device such as the stimulator 100 may adjust the applied stimulus intensity based on a feedback variable that is determined from one or more measured ECAP characteristics. In one implementation, the device may adjust the stimulus intensity to maintain the measured ECAP amplitude at a target response intensity. For example, the device may calculate an error between a target ECAP amplitude and a measured ECAP amplitude, and adjust the applied stimulus intensity to reduce the error as much as possible, such as by adding the scaled error to the current stimulus intensity. A neuromodulation device that operates by adjusting the applied stimulus intensity based on a measured ECAP characteristic is said to be operating in closed-loop mode and will also be referred to as a closed-loop neural stimulation (CLNS) device. By adjusting the applied stimulus intensity to maintain the measured ECAP amplitude at an appropriate target response intensity, such as an ECAP target 520 illustrated in FIG. 4b, a CLNS device will generally keep the stimulus intensity within the therapeutic range as patient posture varies.

A CLNS device comprises a stimulator that takes a stimulus intensity value and converts it into a neural stimulus comprising a sequence of electrical pulses according to a predefined stimulation pattern. The stimulation pattern is parametrised by multiple stimulus parameters including stimulus amplitude, pulse width, number of phases, order of phases, number of stimulus electrode poles (two for bipolar, three for tripolar etc.), and stimulus rate or frequency. At least one of the stimulus parameters, for example the stimulus amplitude, is controlled by the feedback loop.

In an example CLNS system, a user (e.g. the patient or a clinician) sets a target response intensity, and the CLNS device performs proportional-integral-differential (PID) control. In some implementations, the differential contribution is disregarded and the CLNS device uses a first order integrating feedback loop. The stimulator produces stimulus in accordance with a stimulus intensity parameter, which evokes a neural response in the patient. The intensity of an evoked neural response (e.g. an ECAP) is detected, and its amplitude measured by the CLNS device and compared to the target response intensity.

The measured neural response intensity, and its deviation from the target response intensity, is used by the feedback loop to determine possible adjustments to the stimulus intensity parameter to maintain the neural response at the target intensity. If the target intensity is properly chosen, the patient receives consistently comfortable and therapeutic stimulation through posture changes and other perturbations to the stimulus/response behaviour.

Figure 5:
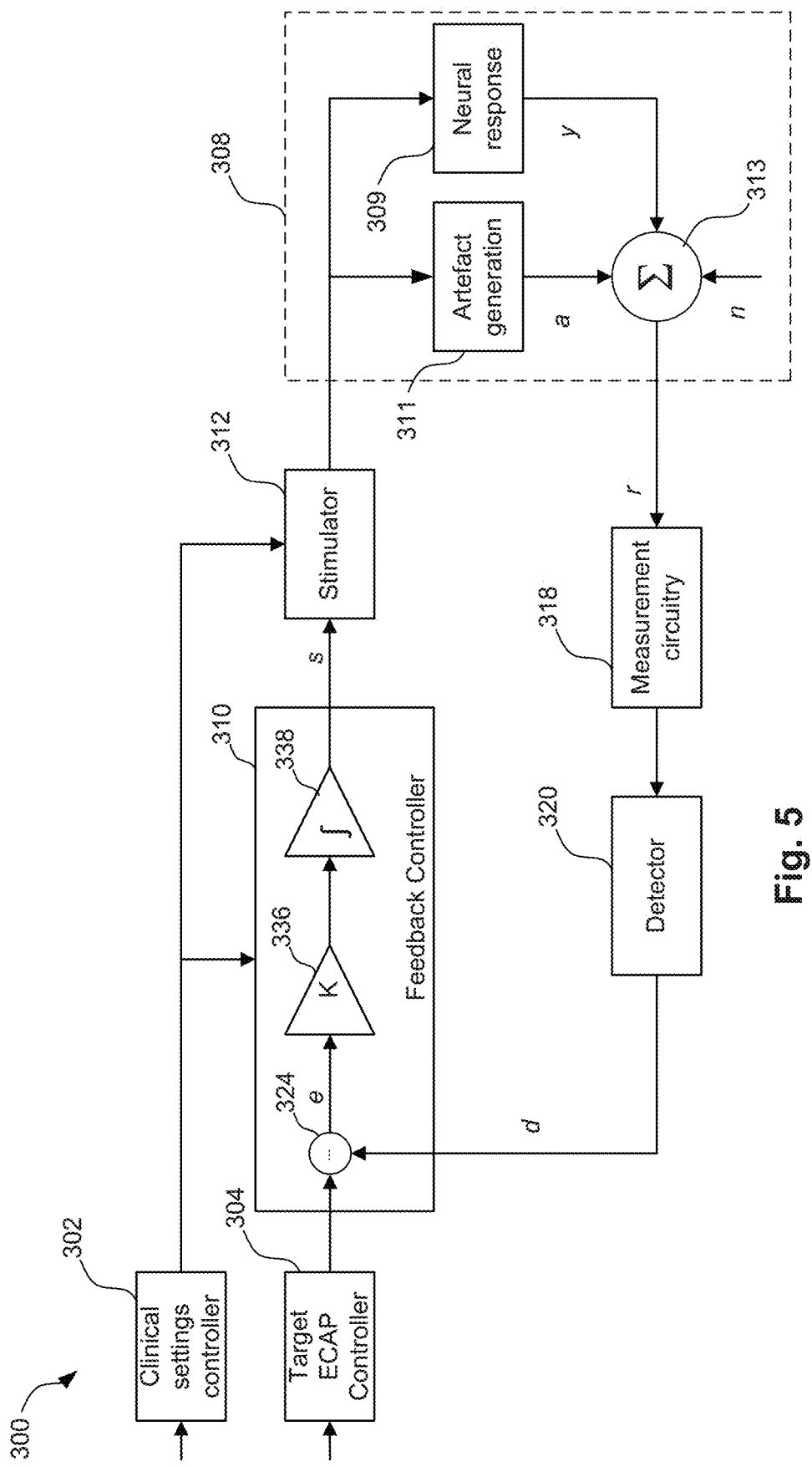
FIG. 5 is a schematic illustrating elements and inputs of a closed-loop neural stimulation system, according to one implementation of the present technology.

FIG. 5 is a schematic illustrating elements and inputs of a closed-loop neural stimulation system (CLNS) 300, according to one implementation of the present technology. The system 300 comprises a stimulator 312 which converts a stimulus intensity parameter (for example a stimulus current amplitude) s, in accordance with a set of predefined stimulus parameters, to a neural stimulus comprising a sequence of electrical pulses on the stimulus electrodes (not shown in FIG. 5). According to one implementation, the predefined stimulus parameters comprise the number and order of phases, the number of stimulus electrode poles, the pulse width, and the stimulus rate or frequency.

The generated stimulus crosses from the electrodes to the spinal cord, which is represented in FIG. 5 by the dashed box 308. The box 309 represents the evocation of a neural response y by the stimulus as described above. The box 311 represents the evocation of an artefact signal a, which is dependent on stimulus intensity and other stimulus parameters, as well as the electrical environment of the measurement electrodes. Various sources of measurement noise n, as well as the artefact a, may add to the evoked response y at the summing element 313 to form the sensed signal r, including electrical noise from external sources such as 50 Hz mains power; electrical disturbances produced by the body such as neural responses evoked not by the device but by other causes such as peripheral sensory input, EEG, EMG, and electrical noise from measurement circuitry 318.

The neural recruitment arising from the stimulus is affected by mechanical changes, including posture changes, walking, breathing, heartbeat and so on. Mechanical changes may cause impedance changes, or changes in the location and orientation of the nerve fibres relative to the electrode array(s). As described above, the intensity of the evoked response provides a measure of the recruitment of the fibres being stimulated. In general, the more intense the stimulus, the more recruitment and the more intense the evoked response. An evoked response typically has a maximum amplitude in the range of microvolts, whereas the voltage resulting from the stimulus applied to evoke the response is typically several volts.

Measurement circuitry 318, which may be identified with measurement circuitry 128, amplifies the sensed signal r (including evoked neural response, artefact, and measurement noise) and samples the amplified sensed signal r to capture a "signal window" comprising a predetermined number of samples of the amplified sensed signal r. The ECAP detector 320 processes the signal window and outputs a measured neural response intensity d. A typical number of samples in a captured signal window is 60. In one implementation, the neural response intensity comprises an ECAP amplitude. The measured response intensity d is input into the feedback controller 310. The feedback controller 310 comprises a comparator 324 that compares the measured response intensity d to a target ECAP amplitude as set by the target ECAP controller 304 and provides an indication of the difference between the measured response intensity d and the target ECAP amplitude. This difference is the error value, e.

The feedback controller 310 calculates an adjusted stimulus intensity parameter, s, with the aim of maintaining a measured response intensity d equal to the target ECAP amplitude. Accordingly, the feedback controller 310 adjusts the stimulus intensity parameters to minimise the error value, e. In one implementation, the controller 310 utilises a first order integrating function, using a gain element 336 and an integrator 338, in order to provide suitable adjustment to the stimulus intensity parameters. According to such an implementation, the current stimulus intensity parameter s may be computed by the feedback controller 310 as $$s = \int K e \, dt \qquad (2)$$

where K is the gain of the gain element 336 (the controller gain). This relation may also be represented as $$\delta s = Ke$$

where δs is an adjustment to the current stimulus intensity parameters.

A target ECAP amplitude is input to the comparator 324 via the target ECAP controller 304. In one embodiment, the target ECAP controller 304 provides an indication of a specific target ECAP amplitude. In another embodiment, the target ECAP controller 304 provides an indication to increase or to decrease the present target ECAP amplitude. The target ECAP controller 304 may comprise an input into the neuromodulation device, via which the patient or clinician can input a target ECAP amplitude, or indication thereof. The target ECAP controller 304 may comprise memory in which the target ECAP amplitude is stored, and from which the target ECAP amplitude is provided to the feedback controller 310.

A clinical settings controller 302 provides clinical settings to the system 300, including the gain K for the gain element 336 and the stimulus parameters for the stimulator 312. The clinical settings controller 302 may be configured to adjust the gain K of the gain element 336 to adapt the feedback loop to patient sensitivity. The clinical settings controller 302 may comprise an input into the neuromodulation device, via which the patient or clinician can adjust the clinical settings. The clinical settings controller 302 may comprise memory in which the clinical settings are stored, and are provided to components of the system 300.

In some implementations, two clocks (not shown) are used, being a stimulus clock operating at the stimulus frequency (e.g. 60 Hz) and a sample clock for sampling the sensed signal r (for example, operating at a sampling frequency of 10 kHz). As the ECAP detector 320 is linear, only the stimulus clock affects the dynamics of the CLNS 300. On the next stimulus clock cycle, the stimulator 312 outputs a stimulus in accordance with the adjusted stimulus intensity s. Accordingly, there is a delay of one stimulus clock cycle before the stimulus intensity is updated in light of the error value e.

Figure 7:
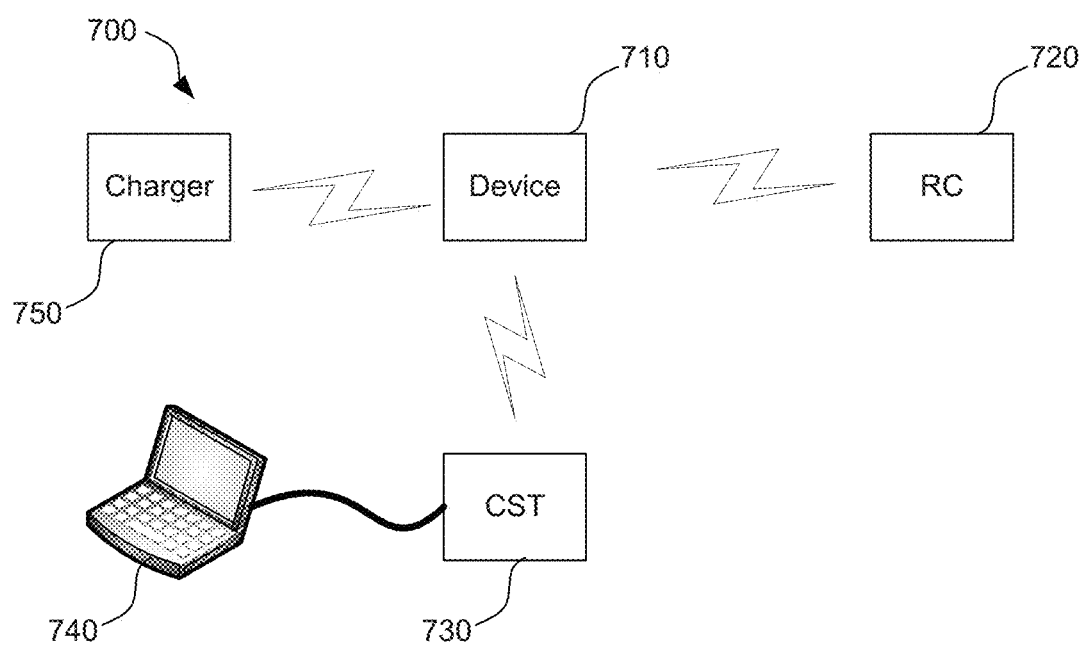
FIG. 7 is a block diagram of a neural stimulation therapy system including the implanted stimulator of FIG. 1 according to one implementation of the present technology.

FIG. 7 is a block diagram of a neural stimulation system 700. The neural stimulation system 700 is centred on a neuromodulation device 710. In one example, the neuromodulation device 710 may be implemented as the stimulator 100 of FIG. 1, implanted within a patient (not shown). The neuromodulation device 710 is connected wirelessly to a remote controller (RC) 720. The remote controller 720 is a portable computing device that provides the patient with control of their stimulation in the home environment by allowing control of the functionality of the neuromodulation device 710, including one or more of the following functions: enabling or disabling stimulation; adjustment of stimulus intensity or target neural response intensity; and selection of a stimulation control program from the control programs stored on the neuromodulation device 710.

The charger 750 is configured to recharge a rechargeable power source of the neuromodulation device 710. The recharging is illustrated as wireless in FIG. 7 but may be wired in alternative implementations.

The neuromodulation device 710 is wirelessly connected to a Clinical System Transceiver (CST) 730. The wireless connection may be implemented as the transcutaneous communications channel 190 of FIG. 1. The CST 730 acts as an intermediary between the neuromodulation device 710 and the Clinical Interface (CI) 740, to which the CST 730 is connected. A wired connection is shown in FIG. 7, but in other implementations, the connection between the CST 730 and the CI 740 is wireless.

The CI 740 may be implemented as the external computing device 192 of FIG. 1. The CI 740 is configured to program the neuromodulation device 710 and recover data stored on the neuromodulation device 710. This configuration is achieved by program instructions collectively referred to as the Clinical Programming Application (CPA) and stored in an instruction memory of the CI 740.

Figure 8:
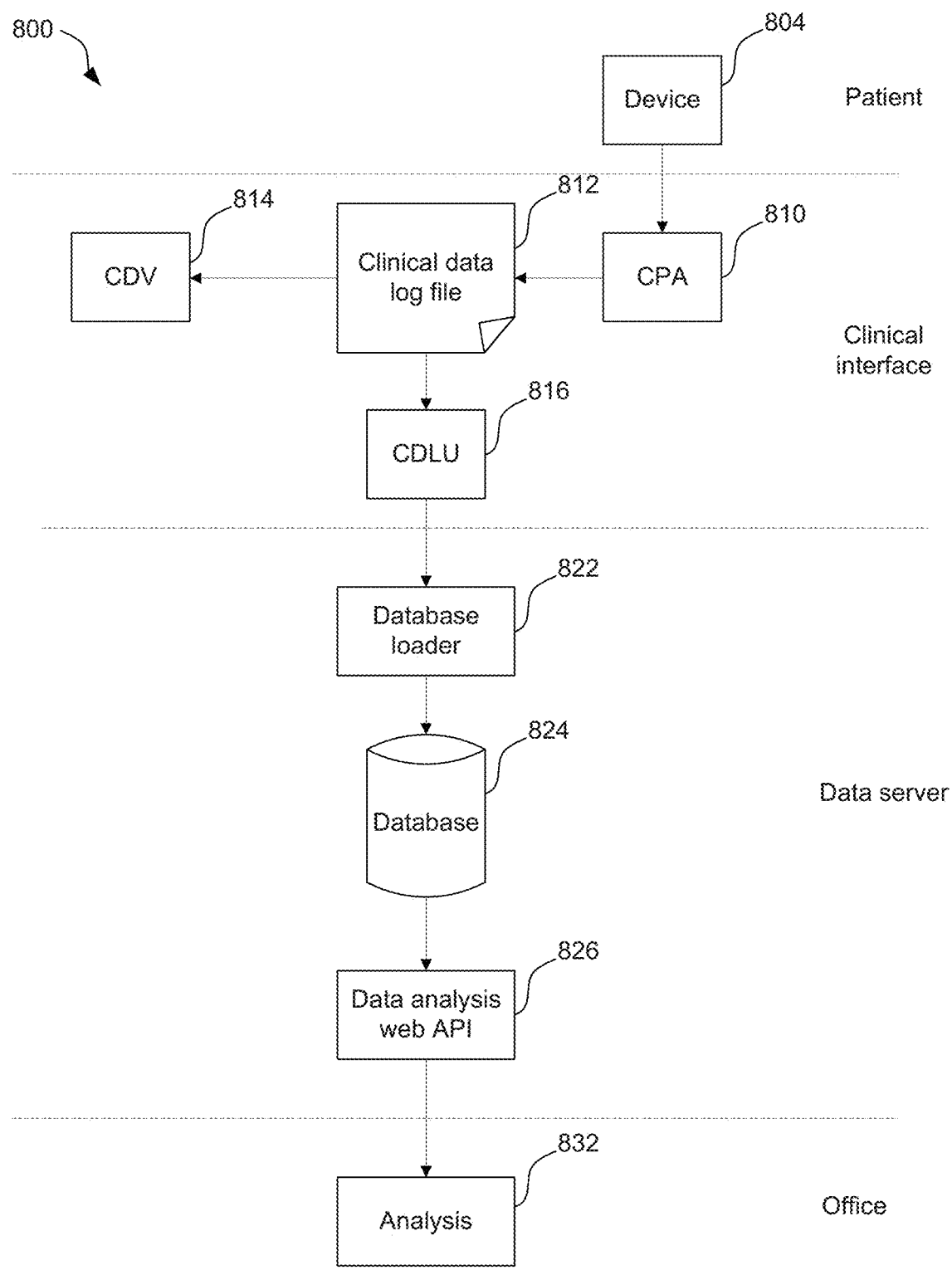
FIG. 8 is a block diagram illustrating the data flow of a neuromodulation therapy system such as the system of FIG. 7.

FIG. 8 is a block diagram illustrating the data flow 800 of a neuromodulation therapy system such as the system 700 of FIG. 7 according to one implementation of the present technology. Neuromodulation device 804, once implanted within a patient, applies stimuli over a potentially long period such as weeks or months and records neural responses, clinical settings, paraesthesia target level, and other operational parameters, discussed further below. Neuromodulation device 804 may comprise a Closed-Loop Stimulator (CLS), in that the recorded neural responses are used in a feedback arrangement to control clinical settings on a continuous or ongoing basis. To effect suitable SCS therapy, neuromodulation device 804 may deliver tens, hundreds or even thousands of stimuli per second, for many hours each day. The feedback loop may operate for most or all of this time, by obtaining neural response recordings following every stimulus, or at least obtaining such recordings regularly. Each recording generates a feedback variable such as a measure of the amplitude of the evoked neural response, which in turn results in the feedback loop changing at least one stimulus parameter for a following stimulus. Neuromodulation device 804 thus produces such data at a rate of tens or hundreds of Hz, or even kHz, and over the course of hours or days this process results in large amounts of clinical data. This is unlike past neuromodulation devices such as open-loop SCS devices which lack any ability to record any neural response.

When brought in range with a receiver, neuromodulation device 804 transmits data, e.g. via telemetry module 114, to a clinical programming application (CPA) 810 installed on a clinical interface. In one implementation, the clinical interface is the CI 740 of FIG. 7. The data can be grouped into two main sources: (1) Data collected in real-time during a programming session; (2) Data downloaded from a stimulator after a period of non-clinical use by a patient. CPA 810 collects and compiles the data into a clinical data log file 812.

All clinical data transmitted by the neuromodulation device 804 may be compressed by use of a suitable data compression technique before transmission by telemetry module 114 and/or before storage into the memory 118 to enable storage by neuromodulation device 804 of higher resolution data. This higher resolution allows neuromodulation device 804 to provide more data for post-analysis and more detailed data mining for events during use. Alternatively, compression enables faster transmission of standard-resolution clinical data.

The clinical data log file 812 is manipulated, analysed, and efficiently presented by a clinical data viewer (CDV) 814 for field diagnosis by a clinician, field clinical engineer (FCE) or the like. CDV 814 is a software application installed on the Clinical Interface (CI). In one implementation, CDV 814 opens one Clinical Data Log file 812 at a time. CDV 814 is intended to be used in the field to diagnose patient issues and optimise therapy for the patient. CDV 814 may be configured to provide the user or clinician with a summary of neuromodulation device usage, therapy output, and errors, in a simple single-view page immediately after log files are compiled upon device connection.

Clinical Data Uploader 816 is an application that runs in the background on the CI, that uploads files generated by the CPA 810, such as the clinical data log file 812, to a data server. Database Loader 822 is a service which runs on the data server and monitors the patient data folder for new files. When Clinical Data Log files are uploaded by Clinical Data Uploader 816, database loader 822 extracts the data from the file and loads the extracted data to Database 824.

The data server further contains a data analysis web API 826 which provides data from the database 824 for third-party analysis such as by the analysis module 832, located remotely from the data server.

The Assisted Programming System

As mentioned above, obtaining patient feedback about their sensations is important during programming of closed-loop neural stimulation therapy, but mediation by trained clinical engineers is expensive and time-consuming. It would therefore be advantageous if patients could program their own implantable device themselves, or with some reduced amount of assistance from a clinician. However, interfaces for current programming systems are non-intuitive and generally unsuitable for direct use by patients because of their technical nature. There is therefore a need for a CPA to be as intuitive for non-technical users as possible while avoiding discomfort to the patient.

Implementations of an Assisted Programming System (APS) according to the present technology are generally configured to meet this need. In some implementations, the APS comprises two elements: the Assisted Programming Module (APM), which forms part of the CPA, and the Assisted Programming Firmware (APF), which forms part of the control programs 122 executed by the controller 116 of the electronics module 110. The data obtained from the patient is analysed by the APM to determine the parameters and settings for the neural stimulation therapy to be delivered by the stimulator 100. The APF is configured to complement the operation of the APM by responding to commands issued by the APM via the CST 730 to the stimulator 100 to deliver specified stimuli to the patient, and by returning, via the CST 730, measurements of neural responses to the delivered stimuli.

In other implementations, all the processing of the APS according to the present technology is done by the APF on the device 710. In other words, the data obtained from the patient is not passed to the APM, but is analysed by the APF to determine the parameters and settings for the neural stimulation therapy to be delivered by the stimulator 100.

In implementations of the APS in which the APM analyses the data from the patient, the APS instructs the device 710 to capture and return signal windows to the CI 740 via the CST 730. In such implementations, the device 710 captures the signal windows using the measurement circuit 128 and bypasses the ECAP detector 320, storing the data representing the raw signal windows temporarily in memory 118 before transmitting the data representing the captured signal windows to the APS for analysis.

Following the processing, the APS may load the determined program onto the device 710 to govern subsequent neural stimulation therapy. In one implementation, the program comprises clinical settings 121, also referred to as therapy parameters, that are input to the neuromodulation device by, or stored in, the clinical settings controller 302. The patient may subsequently control the device 710 to deliver the therapy according to the determined program using the remote controller 720 as described above. In one implementation, the remote controller 720 may control the target ECAP amplitude for the CLNS system 300 via the input to the target ECAP controller 304. The determined program may also, or alternatively, be loaded into the CPA for validation and modification.

Measurement Parameter Setting

As mentioned above, a task of particular importance in programming a closed-loop neural stimulation system is to set parameters for ECAP measurement. This task includes choosing the most suitable measurement electrode configuration for a given stimulus program. This task may also include selecting the most suitable combination of parameters for a parametric ECAP detector at the chosen measurement electrode configuration.

As mentioned above, in the CLNS system 300 of FIG. 5, the neural responses may be processed by the ECAP detector 320 to determine the ECAP amplitude in accordance with the teachings of International Patent Publication No. WO2015/074121. The implementation of the ECAP detector 320 disclosed in International Patent Publication No. WO2015/074121 is an example of a correlation-based detector. Such a correlation-based detector computes a cross-correlation between the samples in the captured signal window and the samples of a parametric correlation filter template such as the 4-lobe filter and returns the amplitude of the ECAP in the signal window from the peak value of the cross-correlation. One adjustable parameter of the 4-lobe filter is its length in samples, or equivalently its period in samples (half its length) or its frequency (the reciprocal of its period in samples, multiplied by the sampling frequency). For efficiency of implementation, the cross-correlation may be computed at a single correlation delay to measure the ECAP amplitude. Another parameter of the 4-lobe filter is therefore the delay at which the single correlation is computed. In what follows, frequency and delay are used as the parameters of the ECAP detector, but it will be understood that length or period may equivalently be used for frequency. In other implementations of a parametric ECAP detector, other parameters may be specified. The one or more parameters of a parametric ECAP detector are notated as the components of a measurement parameter vector m.

A measurement electrode configuration is notated as a vector r comprising two components: the index $r^+$ of the recording electrode, and the index r of the reference electrode. The indices $r^+$ and r are integers from 0 to N−1 where N is the number of electrodes in the electrode array 150. A stimulus program is notated as a vector s whose components are the indices of the stimulus electrodes (one or more stimulus electrodes and one or more return electrodes) and the fixed stimulus parameters characterising the stimulation pattern such as pulse width, number and order of pulse phases, and stimulus frequency. (Stimulus pulse amplitude is not a component of the stimulus program vector s because in a CLNS system it may vary during therapy according to the evoked neural response.)

A propagation model describes the variation of the characteristics of a single-ended ECAP as it propagates along the electrode array. U.S. patent application Ser. No. 18/164,495 by the present applicant, the contents of which are herein incorporated by reference, describes a propagation model for a single-ended ECAP and how its characteristics r (constant of amplitude decay), $v_c$, (conduction velocity), and s (dispersion) at any measurement electrode configuration may be estimated from a differential ECAP measurement at a known measurement electrode configuration.

Figure 9:
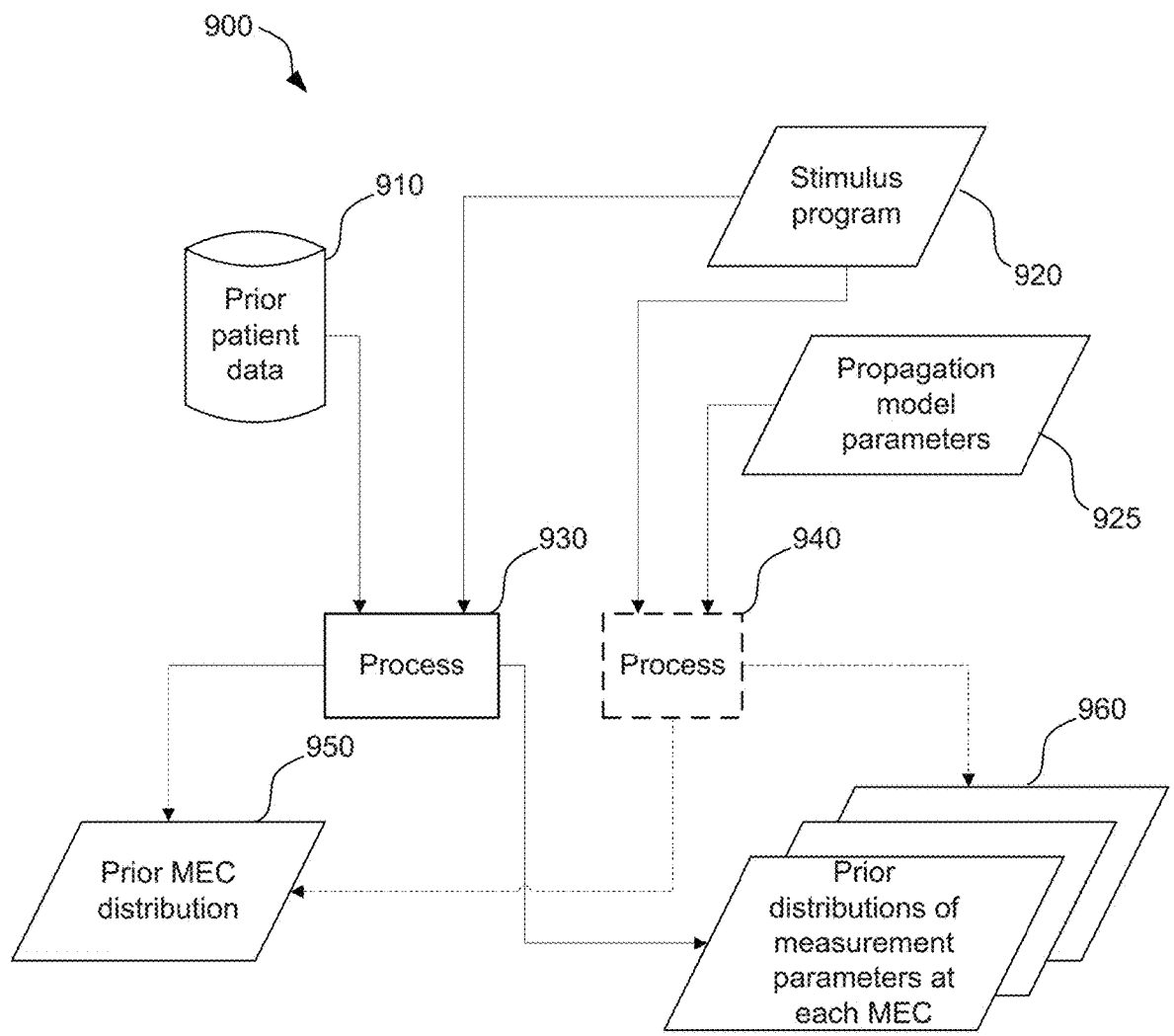
FIG. 9 is a flow chart illustrating a method of estimating prior probability distributions of the most suitable measurement electrode configuration (MEC) vector and the most suitable measurement parameter vector according to one aspect of the present technology.

FIG. 9 is a flow chart illustrating a method 900 of estimating prior probability distributions of suitability of measurement electrode configuration vector r given the stimulus program vector s, and the most suitable measurement parameter vector m given the stimulus program vector s over multiple measurement electrode configuration vectors r. These distributions are notated as p(r|s) and p(m|s, r) respectively, and indicate the probability that a given measurement electrode configuration vector r and measurement parameter vector m respectively are the most suitable for ECAP measurement given their respective conditions.

The method 900 may form part of the APS as described above. The method 900 starts at step 930, which processes prior patient data 910 in light of a stimulus program vector s 920 to produce the distribution p(r|s) 950 of suitability of measurement electrode configuration vector r given the stimulus program vector s. The distribution p(r|s) is referred to as the prior measurement electrode configuration (MEC) distribution. In one implementation, the prior patient data 910 is part of the database 824 and comprises measurement electrode configuration vectors r from prior programmed patients, indexed by stimulus program vectors s. In such an implementation, step 930 extracts the measurement electrode configuration vectors r indexed by the given stimulus program vector s 920 from the prior patient data 910, and constructs the prior MEC distribution 950 from the extracted measurement electrode configuration vectors r, for example as a histogram.

Figure 10A:
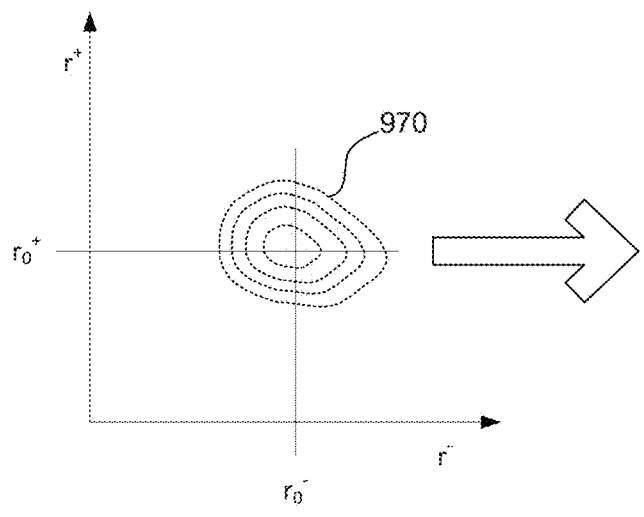
FIG. 10a shows an example prior MEC distribution.

FIG. 10*a* shows an example prior MEC distribution 970, whose dashed lines represent contours of a two-dimensional distribution over the components $(r^-, r^+)$ of the measurement electrode configuration vector r at the stimulus program vector s. The example distribution p(r|s) 970 has its peak value at the measurement electrode configuration vector $r_0=(r_0^-, r_0^+)$. The peak measurement electrode configuration vector $r_0$ represents, in one implementation, the most suitable measurement electrode configuration for the stimulus program vector s, prior to any evidence of the specific circumstances of the CLNS system and the patient being treated.

In some implementations, step 930 may also construct the distributions {p(m|s, r)} 960 of suitability of measurement parameter vector m for each measurement electrode configuration vector r, given the stimulus program vector s. The distributions {p(m|s, r)} are referred to as the prior measurement parameter distributions 960. In one implementation, the prior patient data 910 is part of the database 824 and comprises measurement parameter vectors m from prior programmed patients, indexed by stimulus program vectors s. In such an implementation, the step 930 extracts the measurement parameter vectors m indexed by the given stimulus program vector s and each measurement electrode configuration vector r from the prior patient data 910, and constructs the prior measurement parameter distribution p(m|s, r) for each measurement electrode configuration vector r from the extracted measurement parameter vectors m, for example as a histogram.

In other implementations, step 930 does not construct one or both of the distribution p(r|s) 950 and the distributions {p(m|s, r)} 960. Instead, an optional step 940 computes one or both of the distribution p(r|s) 950 and the distributions {p(m|s, r)} 960 for each measurement electrode configuration vector r from the stimulus program vector s and the parameters 925 of a propagation model. The above-mentioned U.S. patent application Ser. No. 18/164,495 describes how the propagation model parameters 925 may be used to estimate the most suitable measurement electrode configuration vector r and measurement parameter vector m from a stimulus program vector s. The method disclosed therein may be extended to generate one or both of the prior MEC distribution 950 and the prior measurement parameter distributions 960.

Figure 10B:
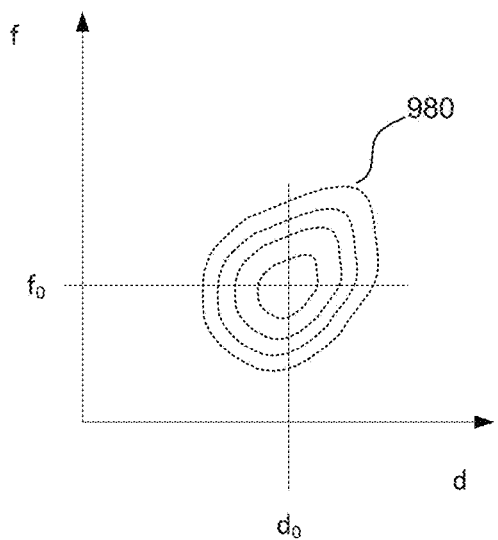
FIG. 10b shows an example prior measurement parameter distribution.

FIG. 10*b* shows an example prior measurement parameter distribution p(m|s, $r_0$) 980, whose lines represent the contours of a two-dimensional distribution over the components (d, f) of the measurement parameter vector m at the stimulus program vector s and the peak measurement electrode configuration vector $r_0$ from FIG. 10*a*. The example prior measurement parameter distribution 980 has its peak value at the peak measurement parameter vector $m_0=(d_0, f_0)$. The peak measurement parameter vector $m_0=(d_0, f_0)$ represents, in one implementation, the most suitable measurement parameters for the stimulus program vector s and the peak measurement electrode configuration vector $r_0$, prior to any evidence of the specific circumstances of the CLNS system and the patient being treated.

Figure 11:
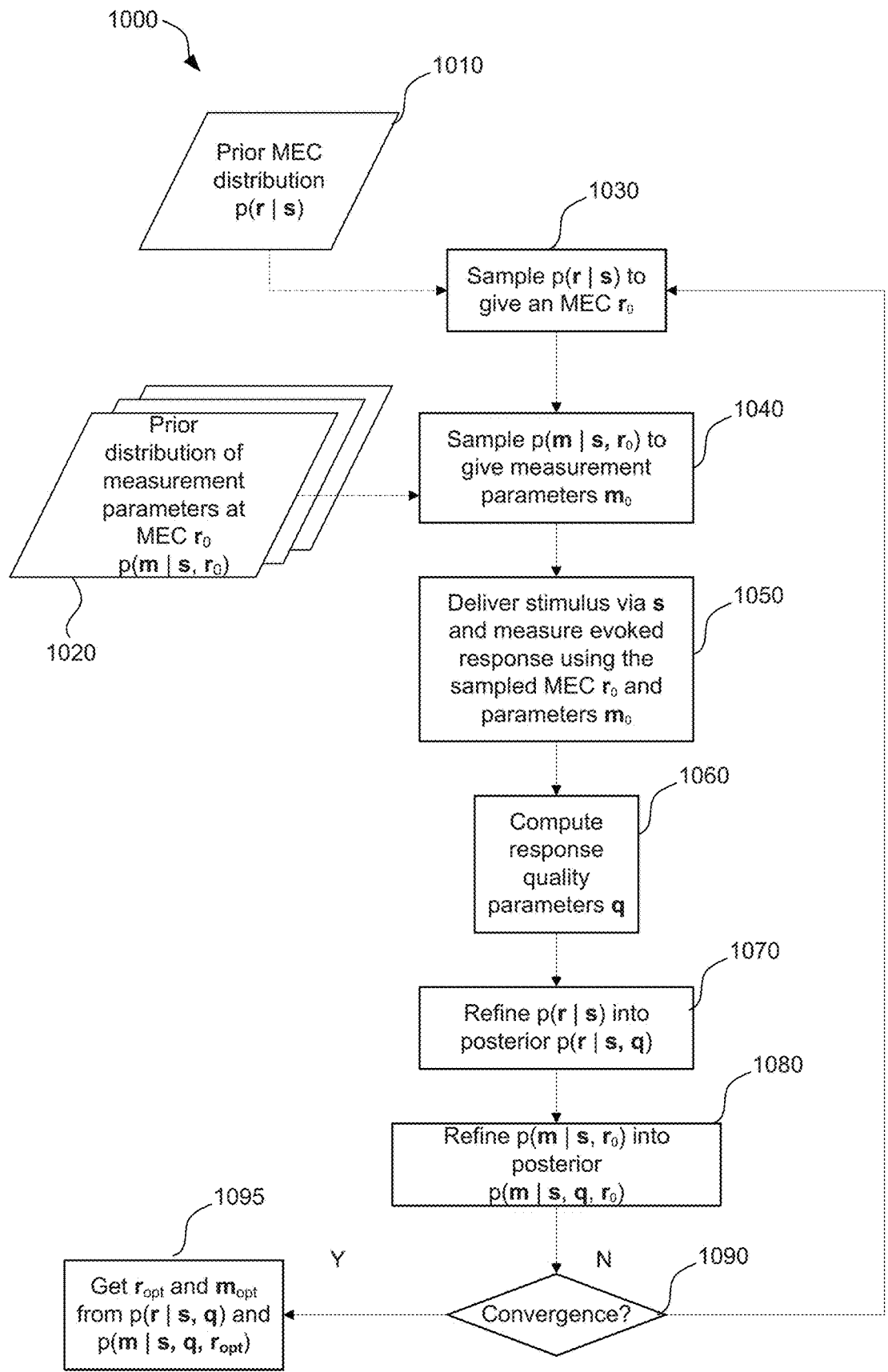
FIG. 11 is a flow chart illustrating a method of obtaining a suitable measurement electrode configuration vector and a suitable measurement parameter vector for that measurement electrode configuration, according to one aspect of the present technology.

FIG. 11 is a flow chart illustrating a method 1000 of obtaining a suitable measurement electrode configuration vector $r_{opt}$ and a suitable measurement parameter vector $m_{opt}$ for the suitable measurement electrode configuration $r_{opt}$, for a given stimulus program vector s and the specific circumstances of the CLNS system and the patient being treated. The method 1000 may form part of the APS as described above. Suitability in the specific circumstances is assessed through measurements of the quality of the evoked responses as measured by measurement electrode configurations and measurement parameters sampled from the prior distributions for the respective vectors. The prior distributions are iteratively refined using the measurements of quality until a stopping criterion is reached, upon which the distributions may be used to generate the suitable measurement electrode configuration vector $r_{opt}$ and the suitable measurement parameter vector $m_{opt}$ for the suitable measurement electrode configuration $r_{opt}$.

The method 1000 starts at step 1030, which samples a MEC distribution p(r|s) 1010 to obtain a sample measurement electrode configuration vector $r_0$. At one implementation of the first execution of step 1030, the MEC distribution p(r|s) 1010 may be a prior MEC distribution such as the prior MEC distribution 950 generated by the method 900. In other implementations of the first execution of step 1030, the MEC distribution p(r|s) 1010 may be a default distribution.

Step 1040 then samples a measurement parameter distribution p(m|s, $r_0$) 1020 at the sample measurement electrode configuration vector $r_0$ to obtain a sample measurement parameter vector $m_0$. At one implementation of the first execution of step 1040, the measurement parameter distribution p(m|s, $r_0$) 1020 may be the one of the prior distributions 960 generated by the method 900 corresponding to the sample measurement electrode configuration vector $r_0$. In other implementations of the first execution of step 1040, the measurement parameter distribution p(m|s, $r_0$) 1020 may be a default distribution.

The next step 1050 then delivers a test stimulus via the stimulus program vector s and applies the ECAP detector 320 at the sample measurement electrode configuration vector $r_0$ using the sample measurement parameter vector $m_0$ to measure the intensity of the evoked response. Step 1050 may be carried out once or multiple times using different stimulus intensity parameter values to obtain one or more measurements of response intensity. The result is one or more (stimulus intensity, response intensity) pairs from the sample measurement electrode configuration vector $r_0$ and the sample measurement parameter vector $m_0$.

Step 1060 computes one or more quality measures q of the response measurement pair(s) made at step 1050. International Patent Publication no. WO2021007615 by the present applicant, the contents of which are herein incorporated by reference, describes a method of obtaining a quality measure (the Signal Quality Indicator or SQI) from a set of (stimulus intensity, response intensity) pairs. Alternatively, International Patent Application no. PCT/AU2022/051556 by the present applicant, the contents of which are incorporated herein by reference, describes a method of obtaining a quality measure (the Growth Curve Quality Index or GCQI) from a set of (stimulus intensity, response intensity) pairs. The one or more quality measures q may be assembled by step 1060 into a quality vector q.

Step 1070 then refines the distribution p(r|s) using the evidence of the quality vector q. In one implementation, Bayes' rule for refining a prior distribution into a posterior distribution given some evidence q may be used at step 1070. Bayes' rule states that the prior distribution p(r|s) may be refined into the posterior distribution p(r|s, q) as follows:

$$p(r|s, q) = \frac{p(r|s)p(q|r, s)}{p(q|s)} \quad (3)$$

where p(q|r, s) is the likelihood of obtaining the quality vector q given the measurement electrode configuration vector r and the stimulus program vector s, and p(q|s) is the distribution of the evidence vector q.

Step 1080 then refines the distribution p(m|s, $r_0$) into a posterior distribution p(m|s, q, $r_0$) using the quality vector q. In one implementation, Bayes' rule for refining a prior distribution into a posterior distribution given some evidence q may be used by step 1080 in similar fashion to step 1070.

Step 1090 tests whether the refined, posterior distributions p(r|s, q) and p(m|s, q, $r_0$) have converged sufficiently that the iteration may be ended. Convergence may be assessed by comparison of the prior distribution p(r|s) with the posterior distribution p(r|s, q), and of the prior distribution p(m|s, $r_0$) with the posterior distribution p(m|s, q, $r_0$).

If not converged ("N"), the method 1000 returns to step 1030. On this and subsequent iterations of step 1030, the original prior distributions 1010 and 1020 are replaced by the posterior distributions p(r|s, q) and p(m|s, q, $r_0$) from the preceding iteration of steps 1070 and 1080.

If converged ("Y"), step 1095 obtains the most suitable measurement electrode configuration vector $r_{opt}$ from the converged posterior distribution p(r|s, q). Step 1095 then obtains the most suitable measurement parameter vector $m_{opt}$ for the measurement electrode configuration $r_{opt}$ from the converged posterior distribution p(m|s, q, $r_{opt}$). In one implementation of step 1095, the modes (peak locations) of the posterior distributions are obtained as the most suitable vectors.

In other implementations of step 1090, other stopping criteria may be used, such as a fixed number of iterations being reached, or the standard deviation relative to the mean (coefficient of variation) along one or more of the component axes of the samples $m_0$ and $r_0$ being below some threshold. Alternatively, if after a certain number of iterations it is clear no convergence is occurring in the one or both of the distributions, the method 1000 may halt and return a message that no suitable measurement configuration and/or measurement parameters can be found.

The APS may set the measurement configuration autonomously from the most suitable measurement electrode configuration vector $r_{opt}$. Alternatively, the APS may recommend the measurement configuration from the most suitable measurement electrode configuration vector $r_{opt}$ to a user of the CI 740. Likewise, the APS may set the measurement parameters autonomously from the most suitable measurement parameter vector $m_{opt}$. Alternatively, the APS may recommend the measurement parameters from the most suitable measurement parameter vector $m_{opt}$ to a user of the CI 740.

The method 1000 may be carried out once at programming time. Additional executions of the method 1000 may take place out of clinic, at therapy time, either periodically on a schedule, or triggered by an event, to determine whether the current measurement electrode configuration and measurement parameters should be changed to more suitable values on account of a change in circumstances such as lead migration. In such an implementation, all the processing of the APS according to the present technology may be done by the APF on the device 710.

In an alternative implementation, the APS may jointly optimise the measurement electrode configuration vector r and the measurement parameter vector m given the stimulus program vector s. This could be done by working with a joint distribution p(m, r|s) rather than separate distributions p(r|s) and p(m|s, r). A method similar to the method 900 may be used to derive a prior joint distribution p(m, r|s) using the stimulus program vector s and either or both of the prior patient data 910 and the propagation model parameters 925. A method similar to the method 1000 may be used to obtain a suitable measurement electrode configuration vector $r_{opt}$ and a suitable measurement parameter vector $m_{opt}$ for the measurement electrode configuration $r_{opt}$ for a given stimulus program vector s by sampling and refining the joint distribution p(m, r|s). Such a method may start with the prior joint distribution p(m, r|s) derived as above, and end by obtaining the most suitable measurement electrode configuration vector $r_{opt}$ and measurement parameter vector $m_{opt}$ from the converged posterior distribution p(m, r|s, q).

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not limiting or restrictive.

LABEL LIST

| | |
|---|---|
| stimulator | 100 |
| patient | 108 |
| electronics module | 110 |
| battery | 112 |
| telemetry module | 114 |
| controller | 116 |
| memory | 118 |
| clinical data | 120 |
| clinical settings | 121 |
| control programs | 122 |
| pulse generator | 124 |
| electrode selection module | 126 |
| measurement circuit | 128 |
| system ground | 130 |
| electrode array | 150 |
| current pulse | 160 |
| neural response | 170 |
| nerve | 180 |
| communications channel | 190 |
| external device | 192 |
| system | 300 |

-continued

| | |
|---|---|
| clinical settings controller | 302 |
| target ECAP controller | 304 |
| box | 308 |
| box | 309 |
| controller | 310 |
| box | 311 |
| stimulator | 312 |
| element | 313 |
| signal amplifier | 318 |
| ECAP detector | 320 |
| comparator | 324 |
| gain element | 336 |
| integrator | 338 |
| activation plot | 402 |
| ECAP threshold | 404 |
| discomfort threshold | 408 |
| perception threshold | 410 |
| therapeutic range | 412 |
| activation plots | 502 |
| respective activation plots | 504 |
| activation plot | 506 |
| ECAP threshold | 508 |
| ECAP threshold | 510 |
| ECAP threshold | 512 |
| ECAP target | 520 |
| ECAP | 600 |
| system | 700 |
| neuromodulation device | 710 |
| remote controller | 720 |
| Clinical settings transceiver | 730 |
| clinical interface | 740 |
| charger | 750 |
| data flow | 800 |
| neuromodulation device | 804 |
| clinical programming application | 810 |
| clinical data log file | 812 |
| clinical data viewer | 814 |
| clinical Data Uploader | 816 |
| database loader | 822 |
| database | 824 |
| data analysis web API | 826 |
| analysis module | 832 |
| method | 900 |
| prior patient data | 910 |
| stimulus program vector | 920 |
| propagation model parameters | 925 |
| step | 930 |
| step | 940 |
| measurement electrode configuration distribution | 950 |
| measurement parameter distributions | 960 |
| prior measurement electrode configuration distribution | 970 |
| prior measurement parameter distribution | 980 |
| method | 1000 |
| measurement electrode configuration distribution | 1010 |
| measurement parameter distribution | 1020 |
| step | 1030 |
| step | 1040 |
| step | 1050 |
| step | 1060 |
| step | 1070 |
| step | 1080 |
| step | 1090 |
| step | 1095 |

The invention claimed is:

1. A neuromodulation system comprising:
a neuromodulation device for controllably delivering a neural stimulus, the neuromodulation device comprising:
a stimulus source configured to provide a neural stimulus to be delivered to a neural pathway of a patient in order to evoke a neural response on the neural pathway;
measurement circuitry configured to process a signal sensed at a measurement electrode configuration subsequent to the delivered neural stimulus, the sensed signal including an evoked neural response; and
a control unit configured to:
control the stimulus source to provide the neural stimulus according to a predetermined stimulus program vector; and
measure an intensity of the evoked neural response in the sensed signal using a measurement parameter vector; and
a processor configured to:
obtain an initial measurement electrode configuration for the predetermined stimulus program vector from a prior probability distribution of suitability of measurement electrode configurations;
instruct the control unit to control the stimulus source to provide a plurality of neural stimuli of different stimulus intensities to the neural pathway according to the predetermined stimulus program vector;
measure intensities of neural responses evoked by the neural stimuli and sensed via a current measurement electrode configuration;
compute one or more quality measures of the evoked neural responses using the measured neural response intensities and the respective stimulus intensities;
refine the prior probability distribution of suitability of measurement electrode configurations using the one or more quality measures; and
obtain a new measurement electrode configuration for the predetermined stimulus program vector from the refined prior probability distribution of suitability of measurement electrode configurations.

2. The neuromodulation system of claim 1, wherein the processor is further configured to repeat the instructing, measuring, computing, refining, and obtaining until a stopping criterion is reached.

3. The neuromodulation system of claim 1, wherein the processor is further configured to compute the prior probability distribution of suitability of measurement electrode configurations from:
the predetermined stimulus program vector of the neuromodulation device; and
prior patient data.

4. The neuromodulation system of claim 1, wherein the processor is further configured to:
obtain an initial measurement parameter vector for the predetermined stimulus program vector and the initial measurement electrode configuration from one of a plurality of prior probability distributions of suitability of measurement parameters corresponding to the initial measurement electrode configuration and the stimulus program vector;
measure the intensities of the neural responses evoked by the neural stimuli and sensed via the initial measurement electrode configuration using the initial measurement parameter vector; and
refine the prior probability distribution of suitability of measurement parameters corresponding to the initial measurement electrode configuration using the one or more quality measures.

5. The neuromodulation system of claim 4, wherein the processor is further configured to obtain a new measurement parameter vector for the neuromodulation device using the refined probability distribution of suitability of measurement parameters corresponding to the new measurement electrode configuration.

6. The neuromodulation system of claim 4, wherein the processor is further configured to compute the plurality of probability distributions of suitability of measurement parameters for respective measurement electrode configurations using:
- the predetermined stimulus program vector of the neuromodulation device; and
- prior patient data.

7. The neuromodulation system of claim 1, further comprising an external computing device in communication with the neuromodulation device.

8. The neuromodulation system of claim 7, wherein the processor forms part of the external computing device.

9. The neuromodulation system of claim 1, wherein the processor forms part of the neuromodulation device.

* * * * *